United States Patent
Boles et al.

(10) Patent No.: US 10,469,306 B1
(45) Date of Patent: Nov. 5, 2019

(54) ASSESSING COMPLETION OF EVENTS

(71) Applicant: HCA Holdings, Inc., Nashville, TN (US)

(72) Inventors: Wesley Boles, Fort Walton Beach, FL (US); Alan Scott, Franklin, TN (US); Julie Leraun Nash, Spring Hill, TN (US); Donna Ann Nayduch, Ocala, FL (US); Gregory McCormack, Gallatin, TN (US); Thomas Hoy, Nashville, TN (US); Sean Albert, Chesterfield, VA (US)

(73) Assignee: HCA Holdings, Inc., Nashville, TN (US)

( * ) Notice: Subject to any disclaimer, the term of this patent is extended or adjusted under 35 U.S.C. 154(b) by 0 days.

(21) Appl. No.: 16/170,379

(22) Filed: Oct. 25, 2018

Related U.S. Application Data

(60) Provisional application No. 62/589,069, filed on Nov. 21, 2017, provisional application No. 62/581,343, filed on Nov. 3, 2017, provisional application No. 62/576,931, filed on Oct. 25, 2017.

(51) Int. Cl.
  *H04L 12/24* (2006.01)
  *G06N 20/00* (2019.01)

(52) U.S. Cl.
  CPC .............. *H04L 41/06* (2013.01); *G06N 20/00* (2019.01)

(58) Field of Classification Search
  CPC ................................ H04L 41/06; G06N 20/00
  See application file for complete search history.

(56) References Cited

U.S. PATENT DOCUMENTS

| | | | |
|---|---|---|---|
| 5,913,197 A | 6/1999 | Kameda | |
| 6,937,150 B2 | 8/2005 | Medema et al. | |
| 8,165,897 B2 | 4/2012 | Beraja et al. | |
| 8,645,155 B2 | 2/2014 | Menon et al. | |
| 9,060,266 B2 | 6/2015 | Kim et al. | |
| 9,244,978 B2 * | 1/2016 | Alves .................... | G06F 16/903 |

(Continued)

OTHER PUBLICATIONS

Yao, Wen; Chu, Chao-Hsien; and Li, Zang. "Leveraging complex event processing for smart hospitals using RFID". Journal of Network and Computer Applications. 34, (3), 799-810. Research Collection School of Information Systems. (Year: 2011).*

*Primary Examiner* — John M Macilwinen
(74) *Attorney, Agent, or Firm* — Kilpatrick Townsend & Stockton, LLP

(57) ABSTRACT

A method for assessing completion of events in a network environment is provided. The method includes receiving a first event vector, generating a second event vector, machine matching the first event vector to the second event vector, and generating an output that includes a variable indicating whether an event corresponding to the first event vector is complete. If each of a plurality of first nodes of the first event vector matches a corresponding one of a plurality of the second nodes of the second event vector, the variable indicates that the event corresponding to the first event vector is complete. If at least one of the plurality of the first nodes of the first event vector is mismatched with the corresponding one of the plurality of the second nodes of the second event vector, the variable indicates that the event corresponding to the first event vector is incomplete.

20 Claims, 24 Drawing Sheets

(56) References Cited

U.S. PATENT DOCUMENTS

| | | | |
|---|---|---|---|
| 2004/0143458 A1* | 7/2004 | Pulkkinen | G06Q 10/00 |
| | | | 705/2 |
| 2010/0121654 A1* | 5/2010 | Portnoy | G06F 19/325 |
| | | | 705/3 |
| 2012/0185267 A1* | 7/2012 | Kamen | G06Q 50/22 |
| | | | 705/2 |
| 2017/0308649 A1 | 10/2017 | Lodhia et al. | |

* cited by examiner

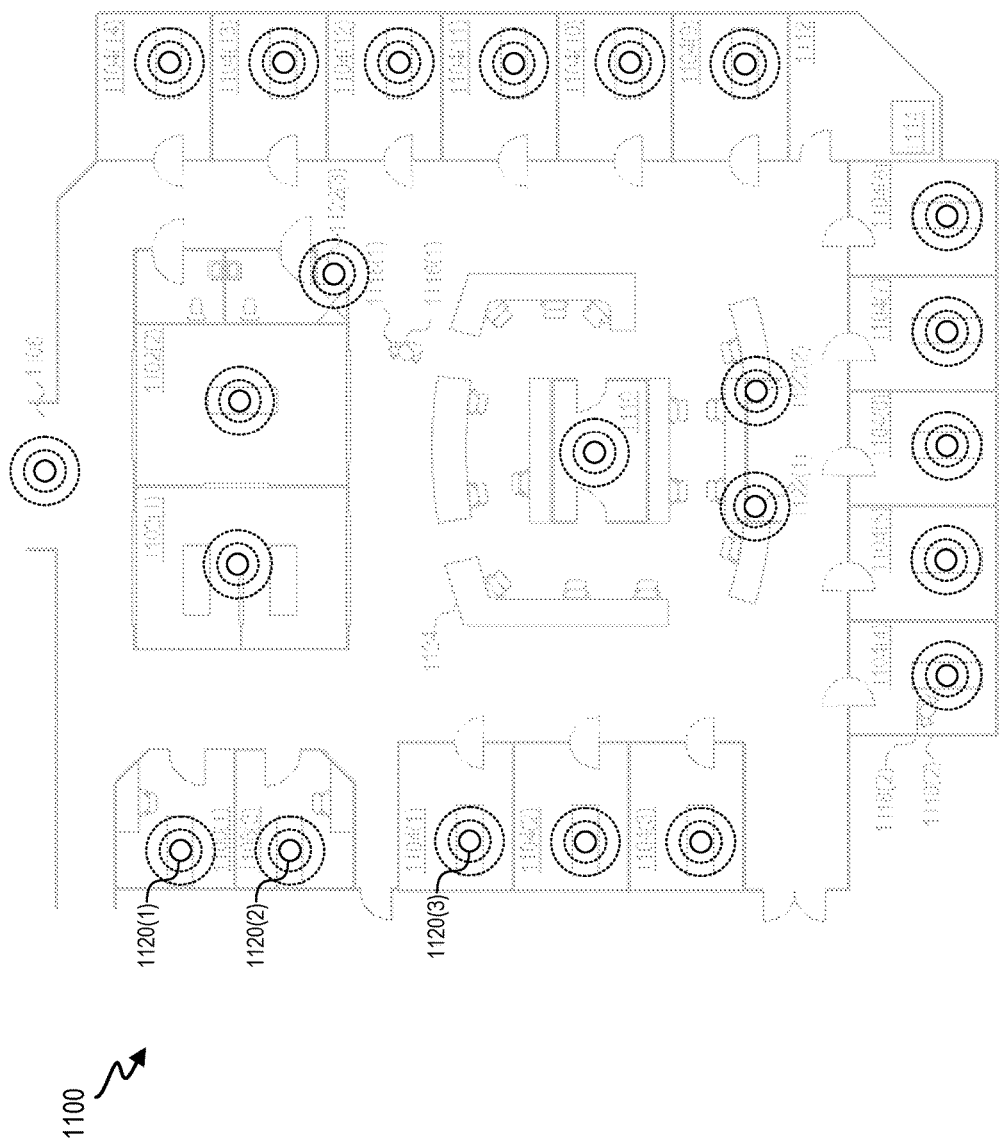

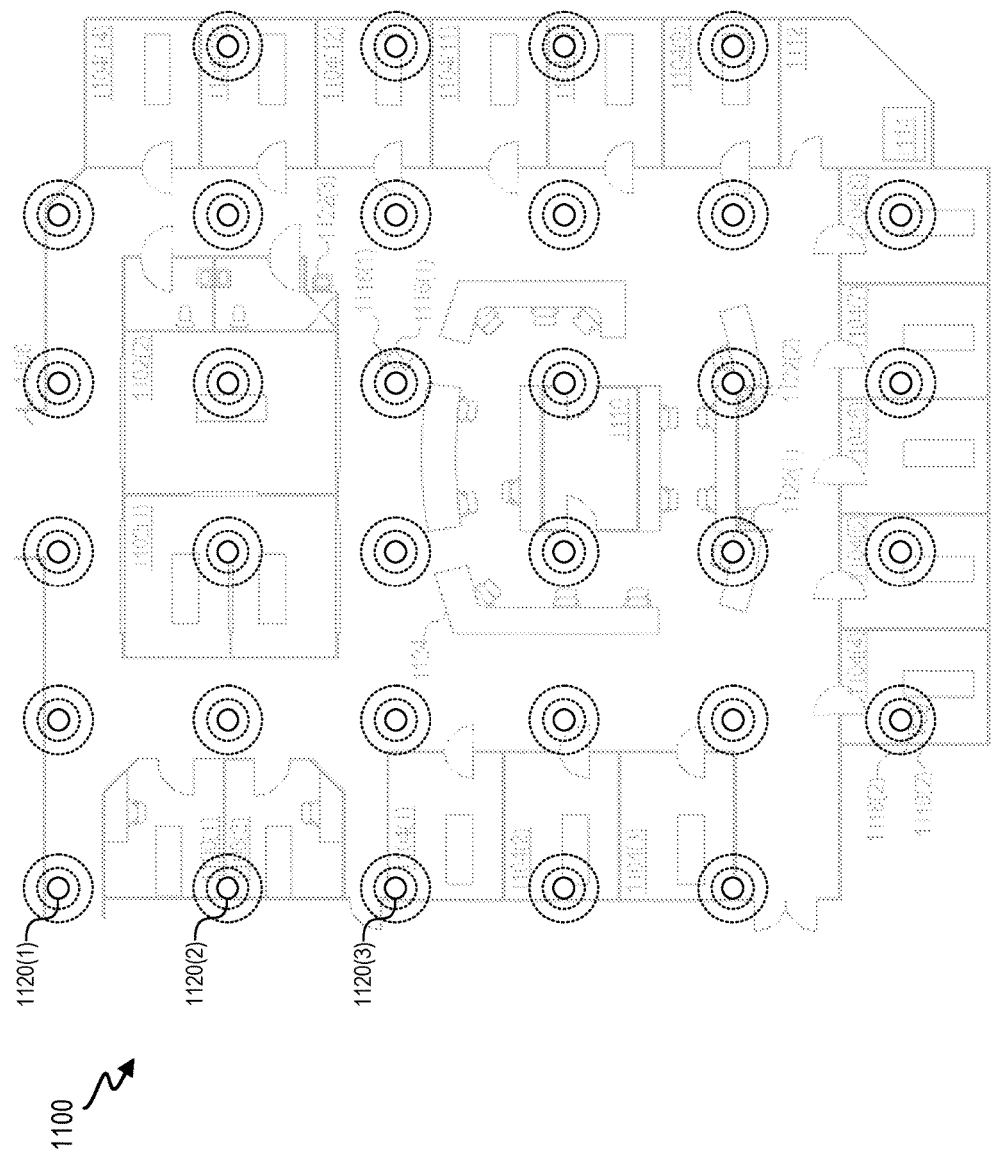

US 10,469,306 B1

ASSESSING COMPLETION OF EVENTS

CROSS-REFERENCE TO RELATED APPLICATIONS

This application claims priority under 35 U.S.C. § 119 to U.S. Provisional Application No. 62/576,931, filed Oct. 25, 2017, U.S. Provisional Application No. 62/589,069, filed Nov. 21, 2017, and U.S. Provisional Application No. 62/581,343, filed Nov. 3, 2017. All of these applications are hereby incorporated by reference in their entireties for all purposes.

BACKGROUND

This specification relates in general to assessing completion of events in a network environment. For example, completion of events may correspond to compliance with protocols. However, manual tracking of compliance with protocols may be slow and burdensome.

BRIEF DESCRIPTION OF THE DRAWINGS

Various examples in accordance with the present disclosure will be described with reference to the drawings, in which:

FIGS. 11A-11C are example diagrams of a facility in which techniques relating to assessing completion of events may be implemented, according to at least one example;

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
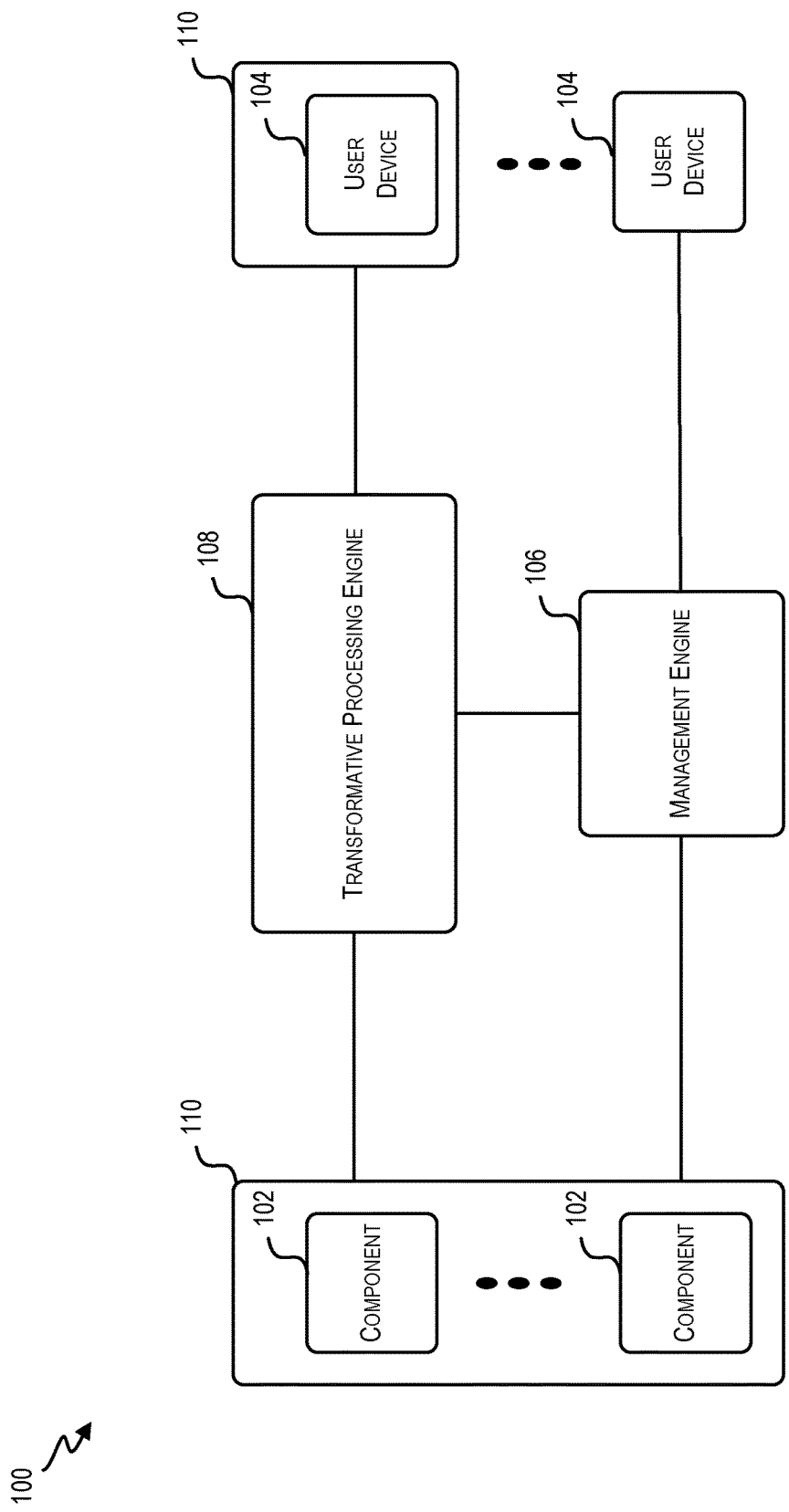
FIG. 1 is an example block diagram illustrating an interaction system in which techniques relating to assessing completion of events may be implemented, according to at least one example.

Referring first to FIG. 1, a block diagram of an example of an interaction system 100 is illustrated. Generally, in interaction system 100, data can be generated at one or more system components 102 and/or user devices 104. Management engine 106 can manage the flow of communications within interaction system. Transformative processing engine 108 can receive, intercept, track, integrate, process, and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102, and/or data in a corresponding communication received from a user device.

As another example, a user device 104 can be configured to detect input received at an interface of the device. The input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect input requesting particular data, to generate a request communication (e.g., to be sent to transformative processing engine), to receive the requested data and/or to present the received data.

The depicted engines, devices and/or components can communicate over one or more networks. A network of one or more networks can include a wired network (e.g., fiber, Ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or focus. Exemplary types of facilities include server farm facilities, web-server facilities, data-storage facilities, telecommunication facilities, service facilities, and/or operational facilities. For example, a first facility may include a structure at a first location at which one or more resources (e.g., computational resources, equipment resources, laboratory resources, and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another example, different facilities may include resources of similar or same types but may vary in terms of, for example, accessibility, location, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing, and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client, or receiving a service from the client.

In some examples, one or more components 102 and one or more user devices 104 may communicate with transformative processing engine 108 and management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., management engine 106, an entity device, and/or a user device) and/or locally or remotely stored. In some examples, transformative processing engine 108 receives data in a particular format (e.g., the HL7 format) or conforming to any other suitable format and/or is configured to transform received data to conform to the particular format.

One or more components 102 of facility 110 can include and/or has access to a local or remote memory for storing generated data. In some examples, the data is stored by one or more servers local to facility 110. The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from a component (or facility), the record service can identify a corresponding record and update the record to include the data (or processed version thereof). In some examples, the record service provides data to transformative processing engine 108.

Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private, and/or proprietary network or protocols. The use of one or more private and/or proprietary protocols can promote secure transfer of data.

Figure 2:
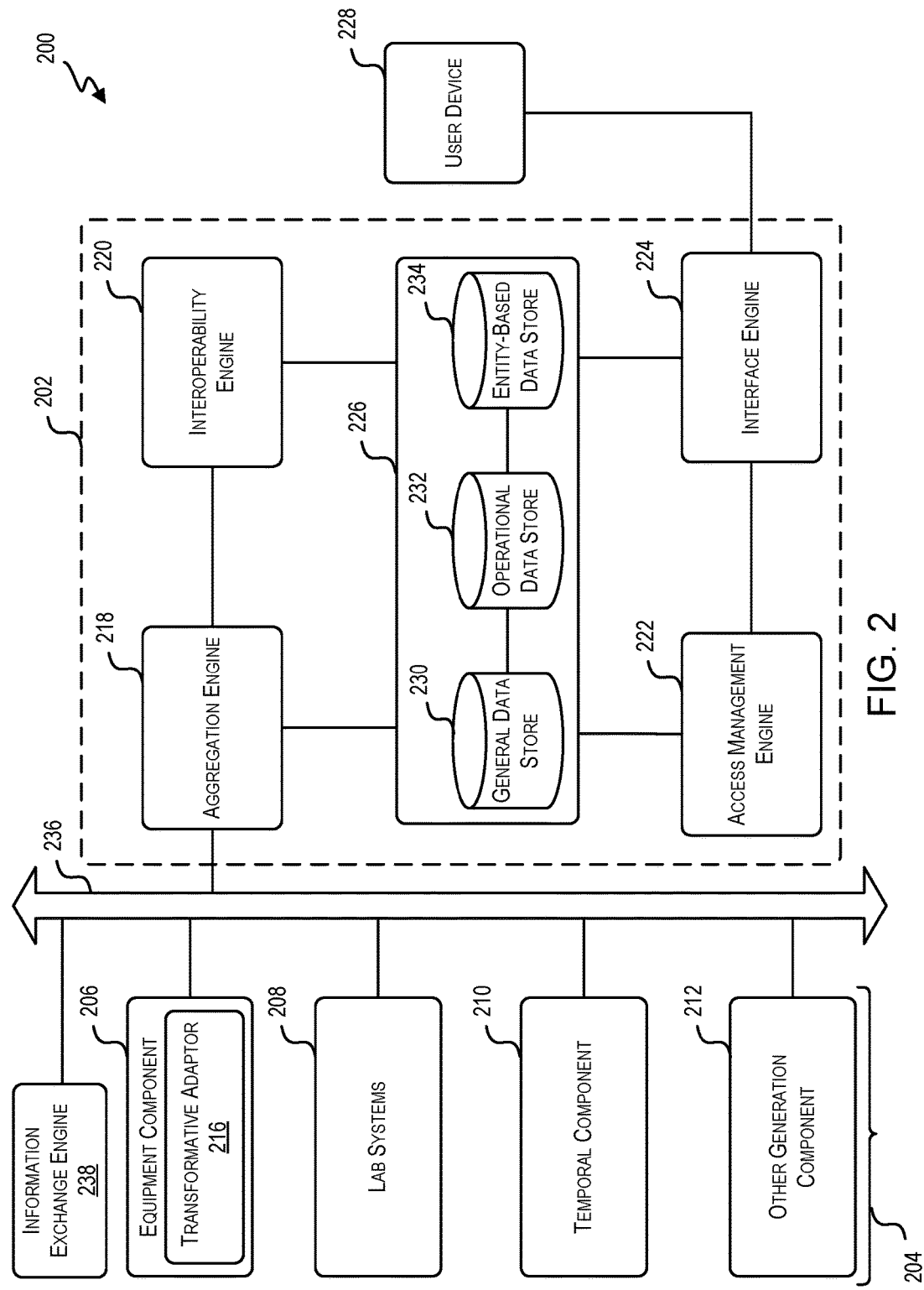
FIG. 2 is an example block diagram illustrating an interaction system in which techniques relating to assessing completion of events may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 include an equipment component 206, a lab systems component 208, a temporal component 210, and other generation component 212. One or more generation components 204 are examples of one or more components 102 discussed with reference to FIG. 1. In some examples, the data may pass to the transformative processing engine 202 via an information exchange service bus 236 (e.g., an enterprise service bus). In some examples, only a portion of the is passed via the information exchange service bus 236, while other portions are passed directly to the transformative processing engine 202 without first passing over the information exchange service bus 236.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces. At least a portion of the data generated by the generation components 204 may be provided to the transformative processing engine 202. In some examples, each generation component 204 includes an agent that executes on the generation components 204 and determines which data to send to the transformative processing engine 202 and other engines described herein. In some examples, the generation components 204 provide data to the transformative processing engine 202 via a messaging bus (e.g., an information exchange service bus 236). The messaging bus, which may be included in the transformative processing engine 202 or separate, is able to see data that moves throughout the interaction system 200. The information exchange service bus 236 also includes a subscription registry that can be used to manage subscriptions to the information exchange service bus 236 for certain data (e.g., data having certain characteristics). The information exchange service bus 236 may send and/or direct data to certain other entities when appropriate as indicated by subscription records in the registry.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Temporal component 210 may include any suitable computing devices used with respect to interaction system 200. For example, temporal component 210 can be configured to allocate a resource to a particular entity during a particular temporal window. Temporal component 210 can monitor a schedule for the resource and can identify one or more available temporal windows that may be secured by a particular entity. Upon receiving an indication, temporal component 210 may update a schedule of a resource to reflect that a particular temporal window is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the location and other details about the component or the user device. In some examples, the component and the user device may include global positioning chips that are configured to determine a geolocation.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine, and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, and the like. Access management engine 222 may also verify that the user device 228 has an IP address or geographical location that corresponds to an authorized list, that the user device 228 includes a plug-in for properly accessing the data store 226, that the user device 228 is running certain applications required to access the data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

As described herein, an information exchange engine 238 shares a network connection with the information exchange service bus 236. The information exchange engine 238 is configured to monitor data (e.g., messages) that is passed over the information exchange service bus 236 and, from the monitored data, select certain portions to provide to one or more authorized user devices. The information exchange engine 238 is also configured to route inbound messages and route outbound messages, as described herein. The information exchange engine 238 is also configured to generate customized messages based on dependent user data.

Figure 3:
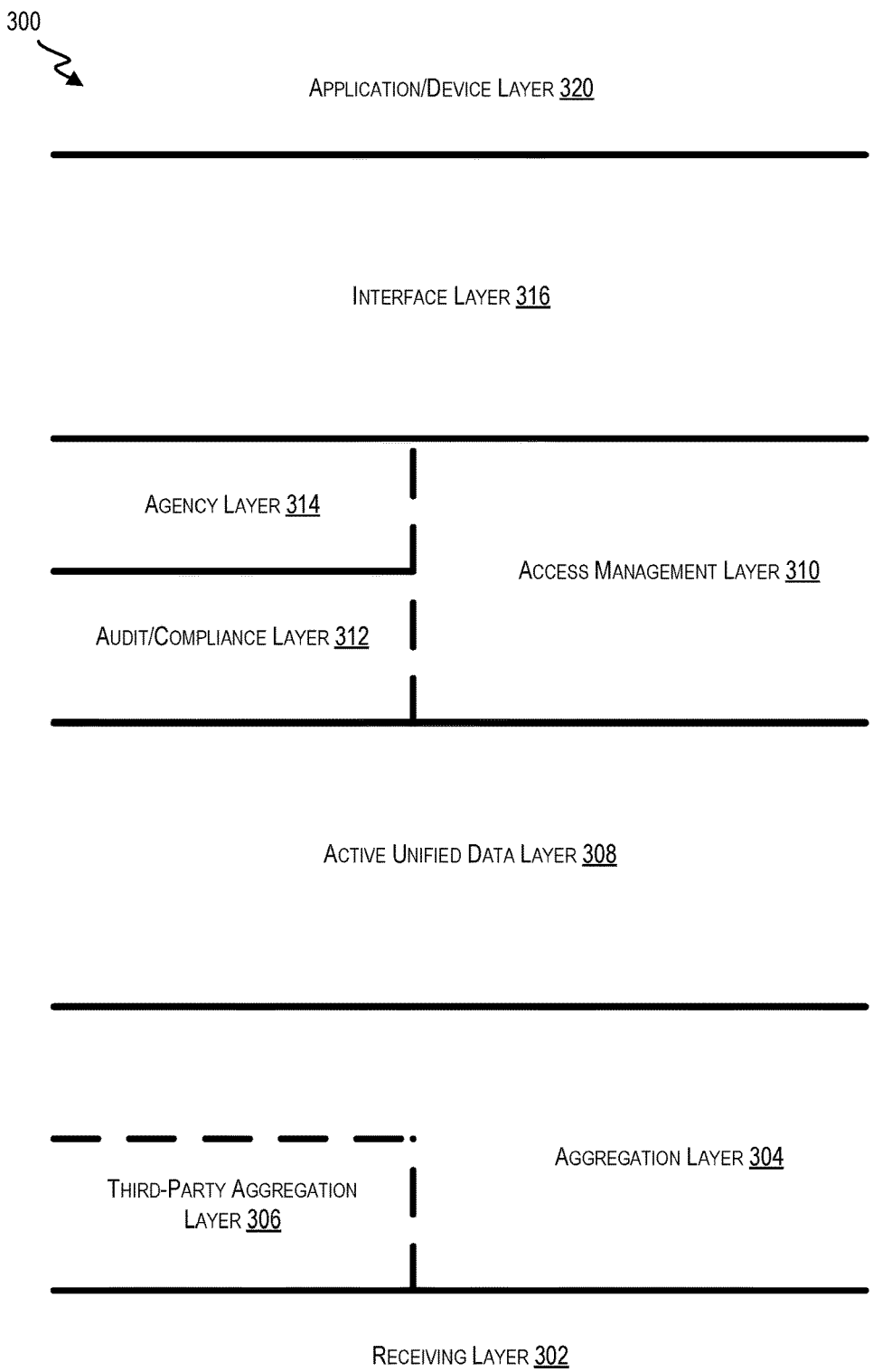
FIG. 3 is an example schematic model illustrating a network communication model in which techniques relating to assessing completion of events may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum, or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties.

Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
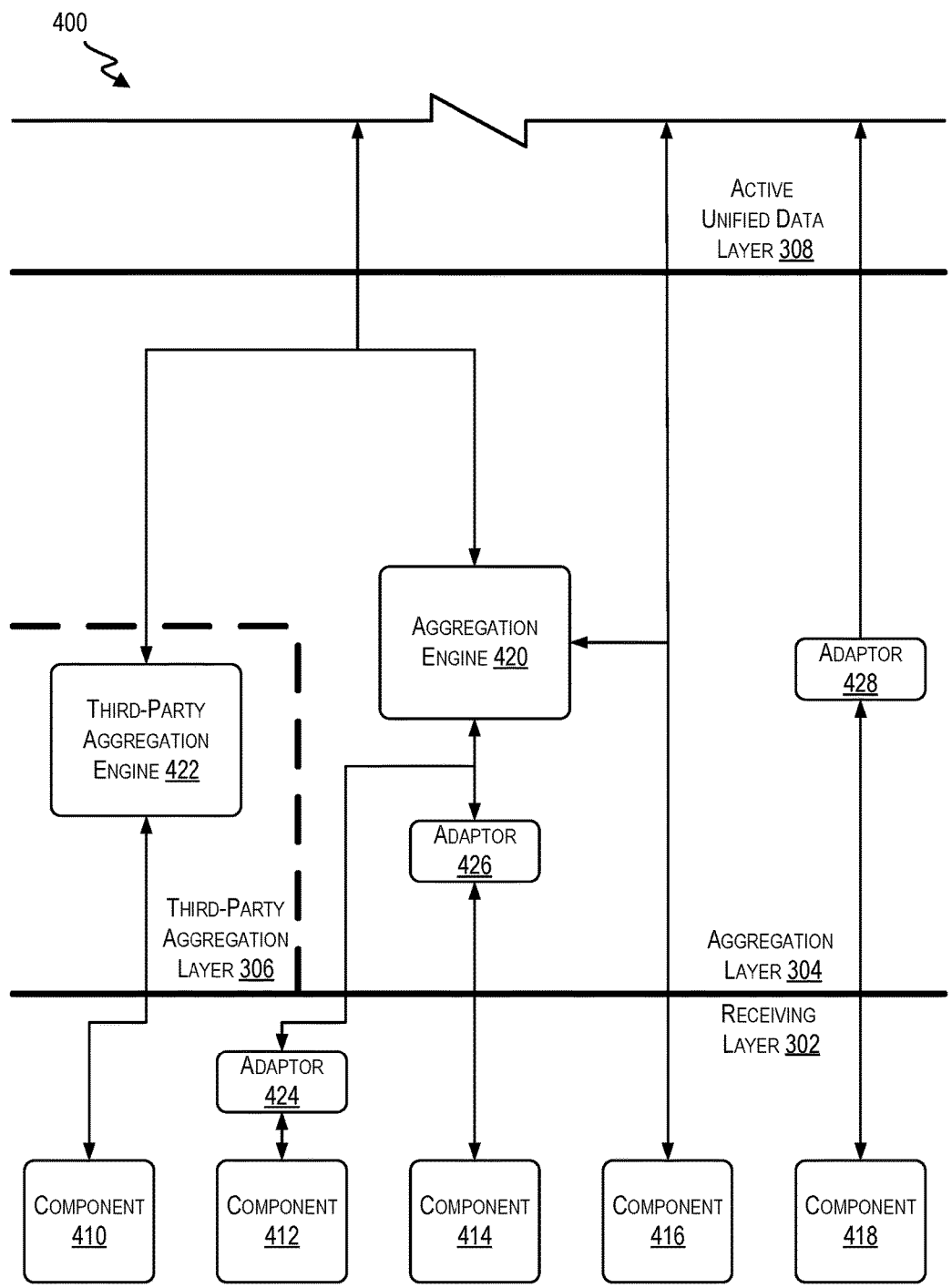
FIG. 4 is an example schematic model illustrating an aspect of the network communication model of FIG. 3 in more detail.

Turning next to FIG. 4, a diagram 400 is shown that depicts a portion of architecture stack 300 according to at least one example. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

The diagram 400 also includes the information exchange service bus 236 and the information exchange engine 238. As introduced herein, messages passing through the aggregation layer 304 can pass over the information exchange service bus 236. In this manner, the information exchange engine 238 can access the messages, route the messages, and/or customize the messages.

Figure 5:
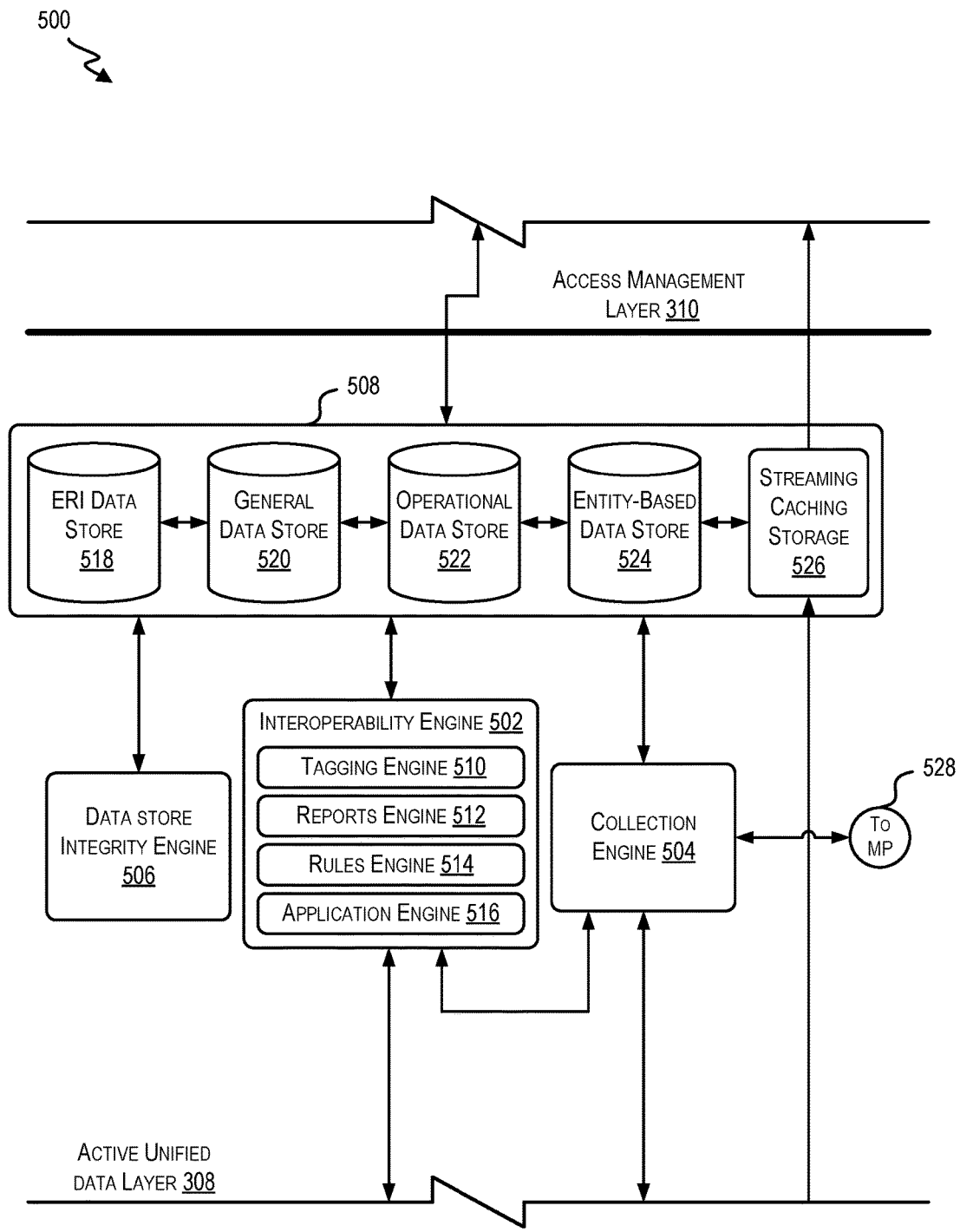
FIG. 5 is an example schematic model illustrating an aspect of the network communication model of FIG. 3 in more detail.

Referring next to FIG. 5, a diagram 500 is shown that depicts a portion of architecture stack 300 according to at least one example. In particular, diagram 500 includes active unified data layer 308 and a portion of access management layer 310. Active unified data layer 308, as illustrated in diagram 500, includes an interoperability engine 502 (e.g., interoperability engine 220), a collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304.

In some examples, the table also includes information for tracking the progress of the message from an origination node to a destination node. For example, typically when a message (e.g., any communication of data) is first received by transformative processing engine 108 (e.g., interoperability engine 502), management engine 106 (e.g., collection engine 504 of management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to management engine 106 that it saw the message. In this manner, management engine 106 may track messages from end-to-end for the life of the message.

In one example, the messages are requests. The requests may be generated based om user input at one of the components. The requests may be received by transformative processing engine 108 and integrated into the system. In some examples, management engine 106 may be notified that the requests have been received and may therefore be configured to generate message IDs for each request. These message IDs may then be associated with each of the requests. As the requests continue to move throughout the interaction system (e.g., away from transformative processing engine 108), management engine 106 may track their movement using the message IDs. If one of the requests does not arrive at its destination, management engine 106 may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, management engine 106 (e.g., collection engine 504 of management engine 106) may receive the message and/or message identifier directly from one of components 410-418. For example, one of components 410-416 may be configured to generate the unique message identifier and/or communicate directly with management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, collection engine 504 provides unique message identifiers to other elements of the interaction system to monitor the messages as they move throughout the interaction system. Collection engine 504 also provides a portion of the unique message identifiers to a management platform (indicated by a circle 528) for further analysis of the message identifiers. Such analyses may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("ERI data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within ERI record data store 518 is retained data. In some examples, the information within ERI record data store 518 is organized according to entity identifying information. Thus, ERI record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data store 522 includes data pertaining to decision making as discussed herein and other data typically used.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
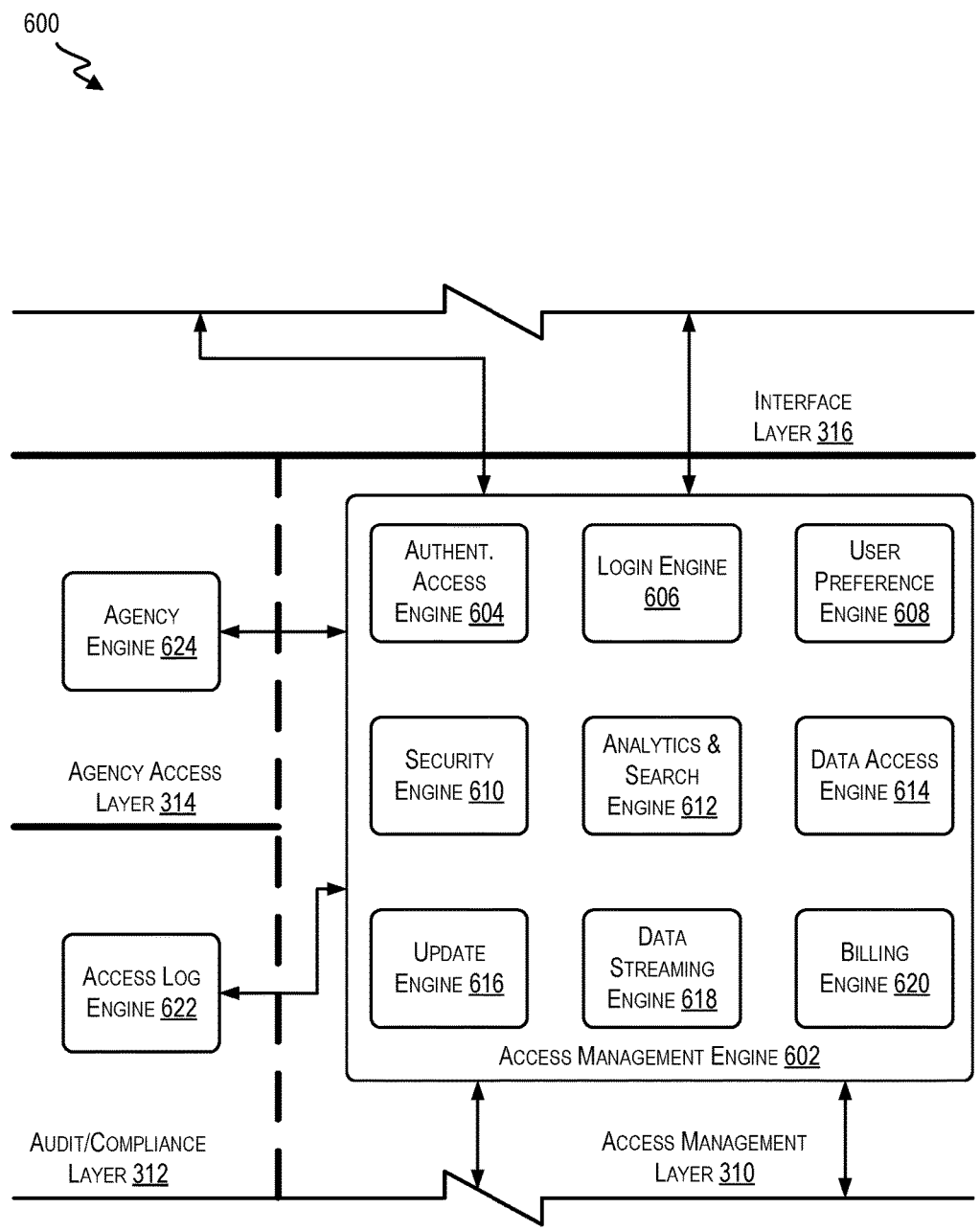
FIG. 6 is an example schematic model illustrating an aspect of the network communication model of FIG. 3 in more detail.

FIG. 6 shows a diagram 600 which depicts a portion of architecture stack 300 according to at least one example. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions, and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. In some examples, agency engine 624 may be used to track one or more performance indicators identified by a government agency and/or to provide report instances of defined types of events. In some examples, a university is an agency that uses agency engine 624 to collect data pertaining to one or more studies. Agency engine 624 can collect the pertinent data, potentially format and/or analyze the data, and facilitate transmission of the data to the appropriate agency.

Figure 7:
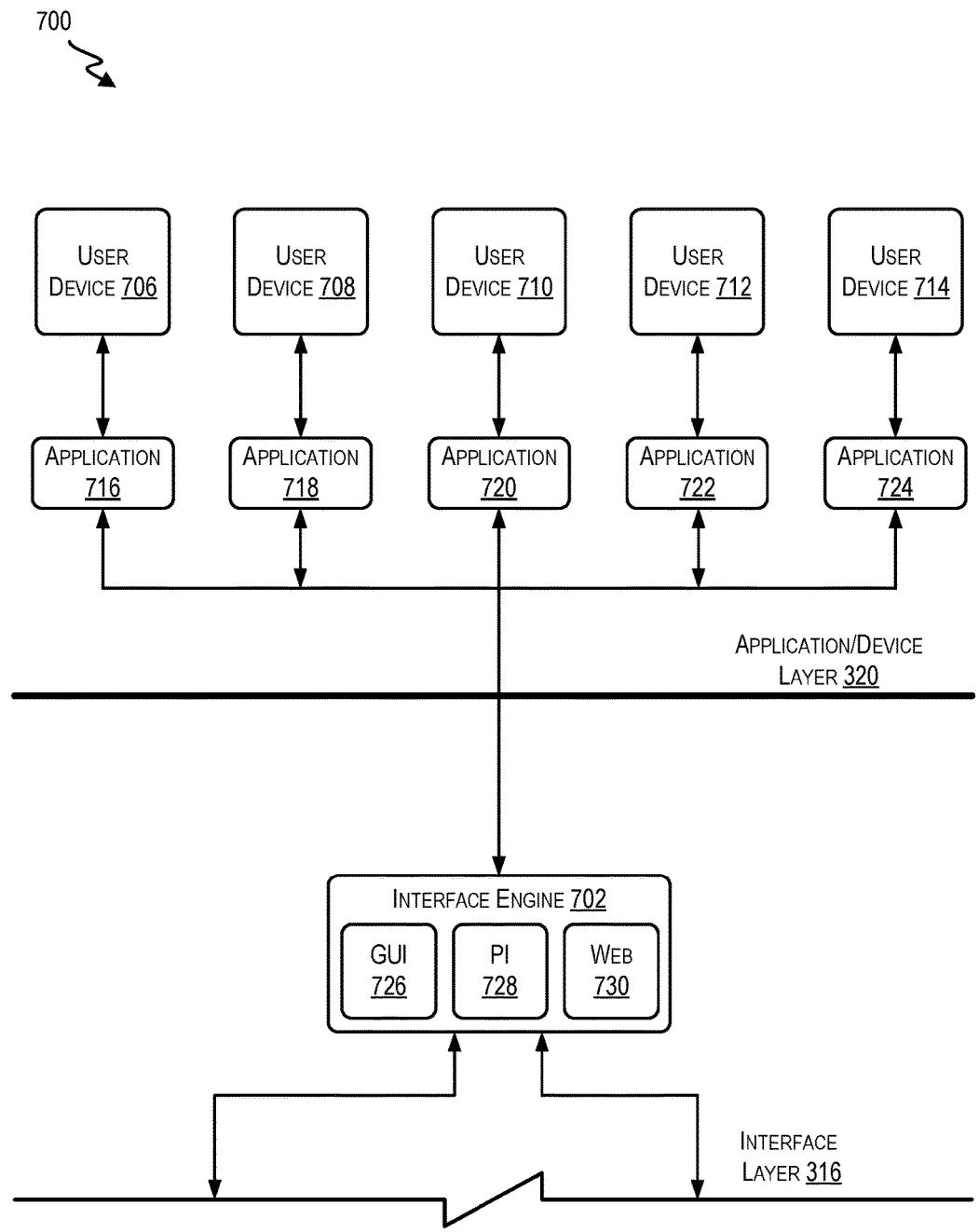
FIG. 7 is an example schematic model illustrating an aspect of the network communication model of FIG. 3 in more detail.

FIG. 7 shows a diagram 700 which depicts a portion of architecture stack 300 according to at least one example. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 706-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for a particular entity. In some examples, application 720 may present different data depending on a focus of the entity and protected information associated with the entity. In this manner, application 720 adapts and automatically adjusts depending on the context in which the entity is using the application. Application 720 may be configured to receive input, adjust presentations, present unprompted alerts, adjust display of content, move more relevant content to the foreground, move less relevant content to the background, and/or populate forms for the entity.

In another example, application 722 may be specific for nurses or types of nurses. In this example, application 722 may include dashboards, widgets, windows, icons, and the like that are customized to individual nurses. Similar to the example discussed above pertaining to the user, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
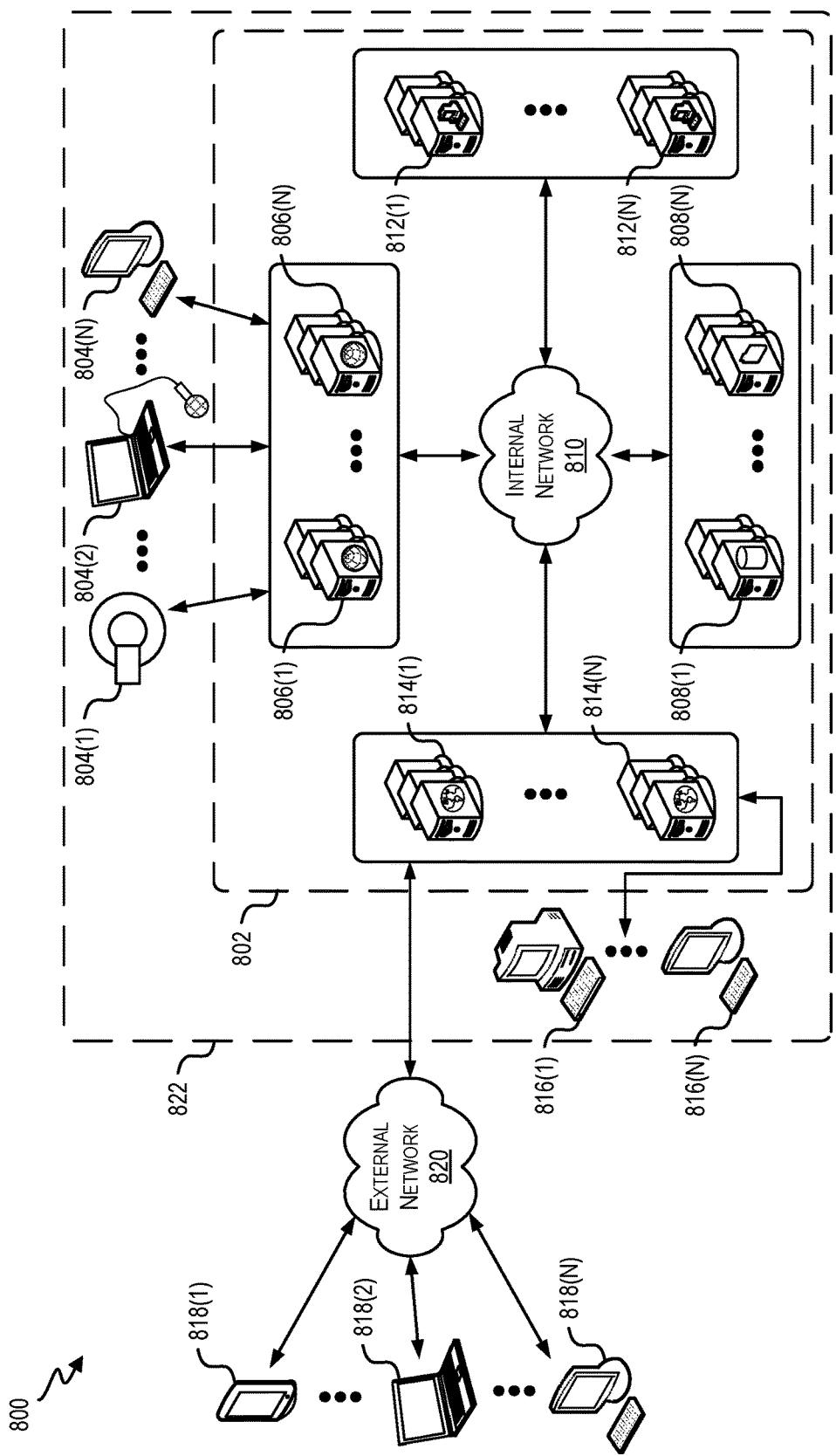
FIG. 8 is an example schematic architecture illustrating an interaction system in which techniques relating to assessing completion of events may be implemented, according to at least one example.

Turning now to FIG. 8, an interaction system 800 is shown according to at least one example. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The environments, systems, networks, models, and the like of FIGS. 1-8 may be used to implement the techniques described herein with reference to FIGS. 9-19. For example, a processing engine is provided that communicates with local servers in connection with wireless signals transmitted and received by mobile wireless transceivers and mounted wireless transceivers. The processing engine may assess the completion of events. For example, the processing engine may track entities to analyze compliance with protocols and, in some instances, may modify the protocols themselves to improve compliance and/or meet the changing needs of a facility. The protocols may ensure that the facility complies with federal, state, industry, and/or organization requirements.

Figure 9:
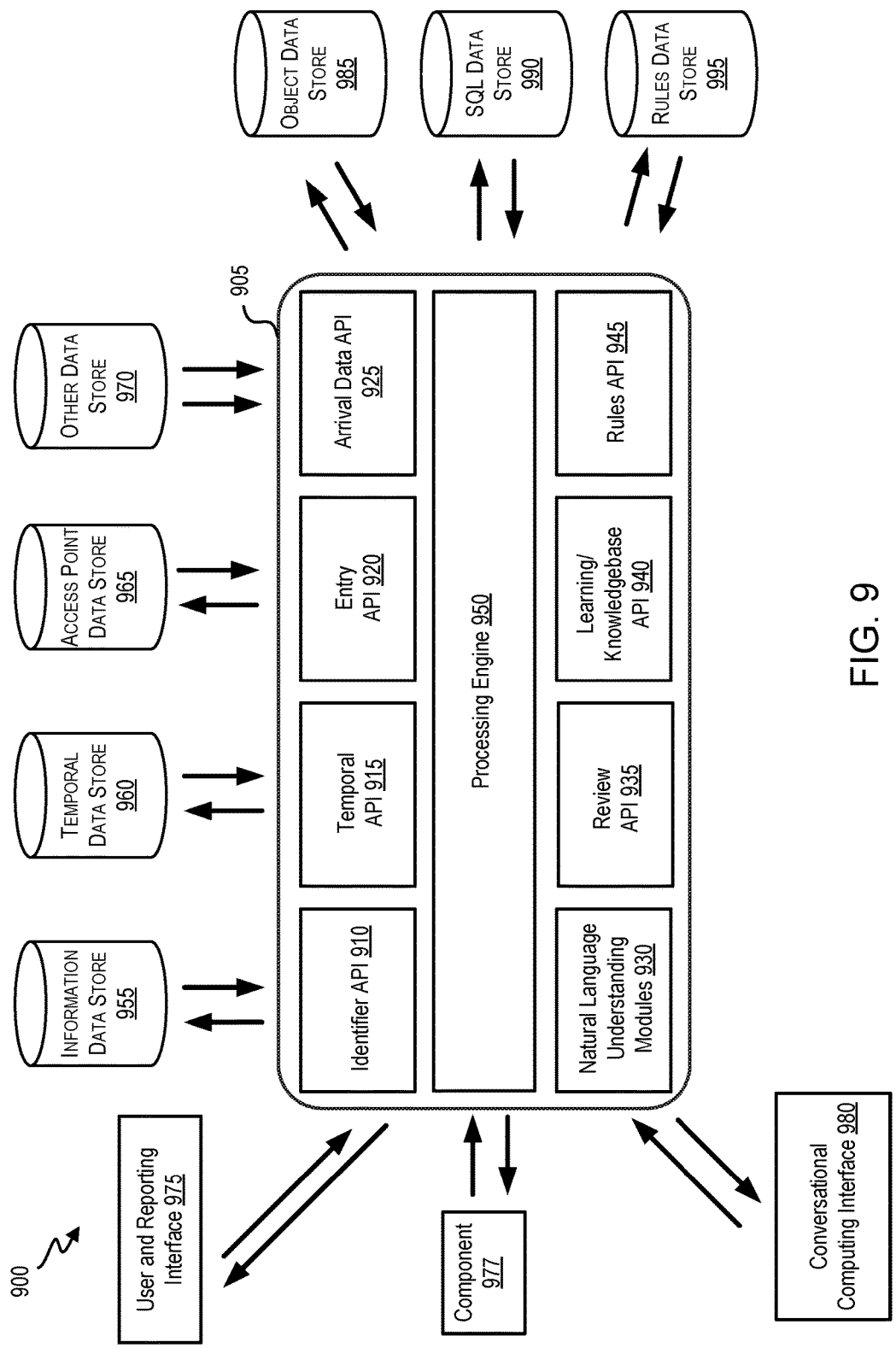
FIG. 9 is an example schematic model illustrating a system for analyzing compliance with a protocol, according to at least one example.

FIG. 9 illustrates a system 900 for assessing completion of events, according to several embodiments of the present disclosure. System 900 may include a platform 905 that has a plurality of application programming interfaces (APIs) and/or modules that communicate with a processing engine 950. For example, platform 905 may include an identifier API 910, a temporal API 915, an entry API 920, an arrival data API 925, natural language understanding modules 930, a review API 935, a learning/knowledgebase API 940, and a rules API 945. Identifier API 910, temporal API 915, entry API 920, arrival data API 925, natural language understanding modules 930, review API 935, learning/knowledgebase API 940, and rules API 945 may be housed within interface layer 316 discussed previously. Platform 905 may be hosted in a web-based environment or through cloud computing.

Platform 905 may communicate with various external components, such as an information data store 955, a temporal data store 960, an access point data store 965, an other data store 970, an object data store 985, a structured query language (SQL) data store 990, a rules data store 995, a user and reporting interface 975, a component 977, and a conversational computing interface 980. Information data store 955, temporal data store 960, access point data store 965, other data store 970, object data store 985, SQL data store 990, and rules data store 995 may be examples of ERI record data store 518, general data store 520, operational data store 522, entity-based data store 524, and/or streaming caching storage 526. User and reporting interface 975 and conversational computing interface 980 may be examples of user device 104. Component 977 may be an example of component 102.

Identifier API 910 may request and receive information about an entity from information data store 955. The information may include an identifier of the entity, such as an RFID tag number. Temporal API 915 may request and receive information about chronologies of entities at a facility from temporal data store 960. Entry API 920 may request and receive information about entries of entities at controlled access points within the facility from access point data store 965. Arrival data API 925 may request and receive information about other entities who access the facility from uncontrolled access points from other data store 970. The information may include identifying information about the other entities and a date and/or time of arrival of the other entities.

A user may utilize user and reporting interface 975 and/or conversational computing interface 980 to provide information about the completion or non-completion of an event, such as compliance or non-compliance with a protocol. The information may include data about one or a plurality of components that make up the event. The user may access user and reporting interface 975 and/or conversational computing interface 980 via any suitable device, such as a computer or a smartphone. User and reporting interface 975 may include a web-based interface, and conversational computing interface 980 may include a short message service (SMS) interface. User and reporting interface 974 and/or conversational computing interface 980 may automatically detect an identifier of the user and a chronology of the input.

Component 977 may determine the identifier and the location of an entity, as described in further detail below. The location of the entity may be determined at a plurality of times. For example, component 977 may include a mobile wireless transmitter and/or a mounted wireless transmitter. The mobile wireless transmitter may be integrated with a computer, a mobile device, a smart phone, a laptop, an electronic badge, an RFID tag, a tablet, or a pager. The mounted wireless transceiver may be integrated with a device having voice recognition and/or facial recognition. For example, the device may be a smart television. The identifier and location of the entity obtained by component 977 may be used to monitor and track progress and completion of events by the entity, as discussed in further detail below.

Platform 905 may track and record an event, including documentation of ownership assignment and resolution of the event. Natural language understanding modules 930 may analyze and interpret information provided by the user via user and reporting interface 975 and/or conversational computing interface 980. Review API 935 may analyze an event and determine whether any follow-up and/or resolution is needed. Learning/knowledgebase API 940 may obtain and analyze information about an event, such as a manual for a piece of equipment that describes how to use the piece of equipment (e.g., a protocol for operating the piece of equipment). Rules API 945 may generate an event that includes a plurality of actions based on a rule or a plurality of rules, such as federal, state, industry, and/or organization requirements.

Object data store 985 may include objects that are referenced by the APIs and/or modules within platform 905. SQL data store may include structured data in which there are relations between different entities and/or variables of the data. Rules data store 995 may include compliance rules for a facility. Each of the compliance rules may indicate the criteria for the rule, a chapter of the rule set where the rule can be found, a level or levels of the facility to which the rule is applied, a type of infraction that is caused by non-compliance with the rule, and/or a status of the rule that indicates whether the rule is active for the facility.

Platform 905 may evaluate the completion or the non-completion of an event. For example, information from temporal data store 960 may indicate whether an entity was scheduled to be present during the event, and information from access point data store 965 may indicate whether the entity accessed the facility through a controlled access point before the event. Processing engine 950 may aggregate this information to determine the likelihood that the entity completed the event.

Platform 905 may also predict the non-completion of an event. For example, processing engine 950 may use machine learning to predict that a minimum number of entities are required at a temporal point. Processing engine 950 may also receive information about functions of entities at the facility from identifier API 910, and information about chronologies of entities at the facility from temporal API 915. Processing engine 950 may then determine whether the minimum number of entities will be present at the temporal point. Processing engine 950 may also determine whether entities with the required functions will be present at the temporal point. If either determination is negative, platform 905 may send a notification message indicating the potential non-completion of the event to user and reporting interface 975 and/or conversational computing interface 980.

Further, platform 905 may detect the non-completion of an event. For example, processing engine 950 may receive information about functions of entities at the facility from identifier API 910, information about controlled access point entries of entities at the facility from entry API 920, and information about uncontrolled access point entries other entities from arrival data API 925. Processing engine 950 may use this information to determine whether the minimum number of entities are present. Processing engine 950 may also use this information to determine whether entities with the required functions are present. If either determination is negative, platform 905 may send a notification message indicating the non-completion of the event to user and reporting interface 975 and/or conversational computing interface 980.

Platform 905 may generate event vectors in order to determine whether an event has been completed. Each event vector may be a data structure that has a plurality of nodes that are spaced in time. Each node may correspond to an action. Processing engine 950 may generate event vectors by incorporating information from various sources. For example, component 977 may provide a series of locations of an entity over time, and review API 935 may use this information to determine a series of actions performed by the entity over time. Alternatively or in addition, user and reporting interface 975 and/or conversational computing interface 980 may provide a series of actions of an entity over time. The event vector may be constructed by arranging the series of actions as a plurality of nodes that are spaced in time.

Figure 10:
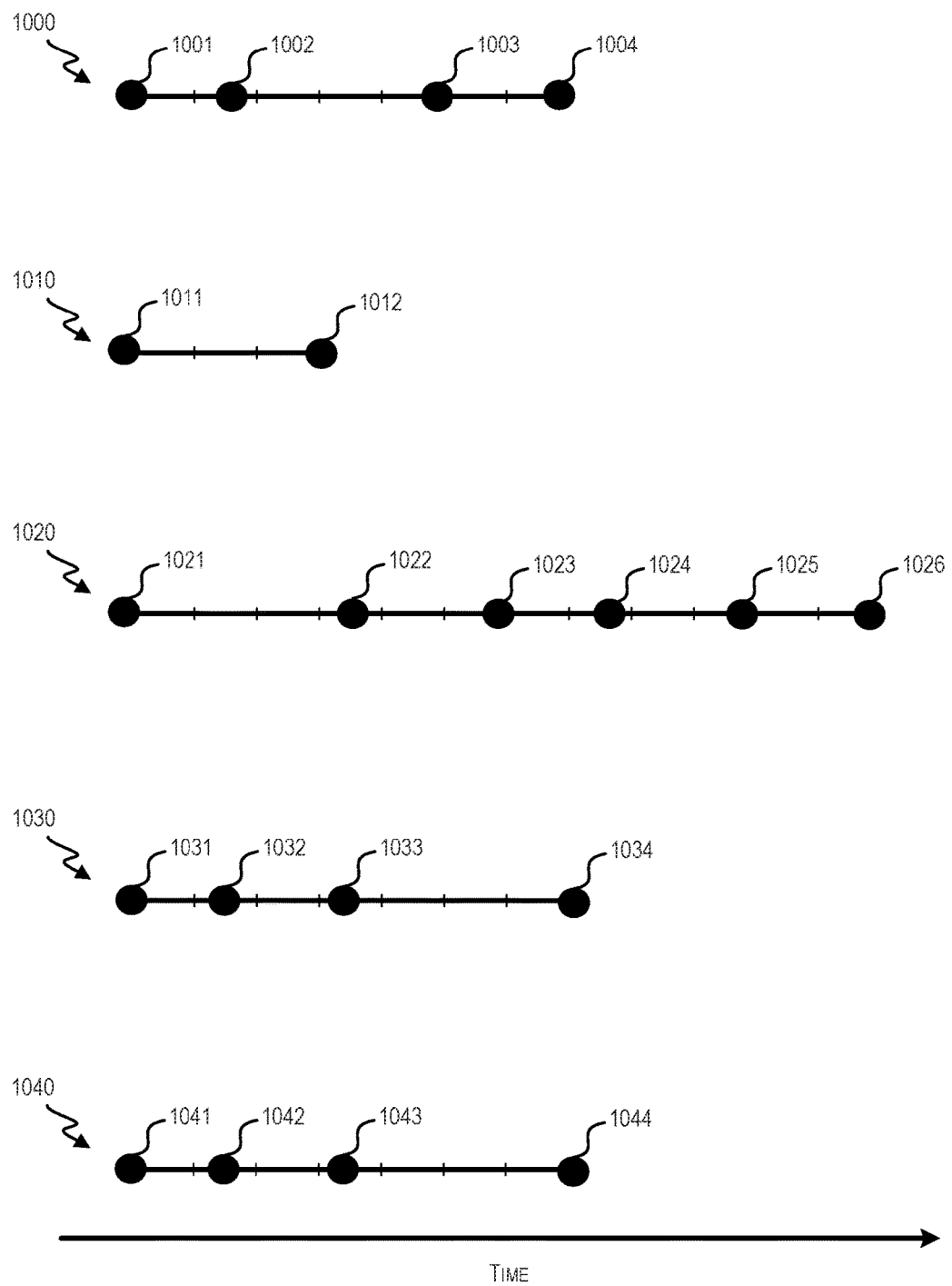
FIG. 10 illustrates event vectors for assessing completion of events, according to at least one example.

FIG. 10 illustrates event vectors 1000, 1010, 1020, 1030, and 1040, according to several embodiments of the present disclosure. Event vectors 1000, 1010, 1020, 1030, and 1040 are data structures having one or more nodes that are spaced in time. Event vector 1000 includes nodes 1001, 1002, 1003, and 1004; event vector 1010 includes nodes 1011 and 1012; event vector 1020 includes nodes 1021, 1022, 1023, 1024, 1025, and 1026; event vector 1030 includes nodes 1031, 1032, 1033, and 1034; and event vector 1040 includes nodes 1041, 1042, 1043, and 1044.

Event vector 1040 may correspond to a protocol. For example, nodes 1041, 1042, 1043, and 1044 of event vector 1040 may correspond to a temporal series of required actions within a protocol. Rules API 945 may generate event vector 1040 based on rules received from rules data store 995.

Event vectors 1000, 1010, 1020, and 1030 may correspond to events that are tracked by processing engine 950. Review API 935 may determine whether an event defined by event vector 1040 has been completed by machine matching event vectors 1000, 1010, 1020, and/or 1030 to event vector 1040. In this example, each of nodes 1031, 1032, 1033, and 1034 of event vector 1030 matches respective nodes 1041, 1042, 1043, and 1044 of event vector 1040. Accordingly, it is determined that the event defined by event vector 1040 was completed by event vector 1030. On the other hand, because event vectors 1000, 1010, and 1020 each have at least one node that does not match respective nodes 1041, 1042, 1043, and 1044 of event vector 1040, it is determined that the event defined by event vector 1040 was not completed by event vectors 1000, 1010, and 1020. Review API 935 may generate an output including a variable to indicate whether the event corresponding to event vector 1040 was completed.

Figure 11A:
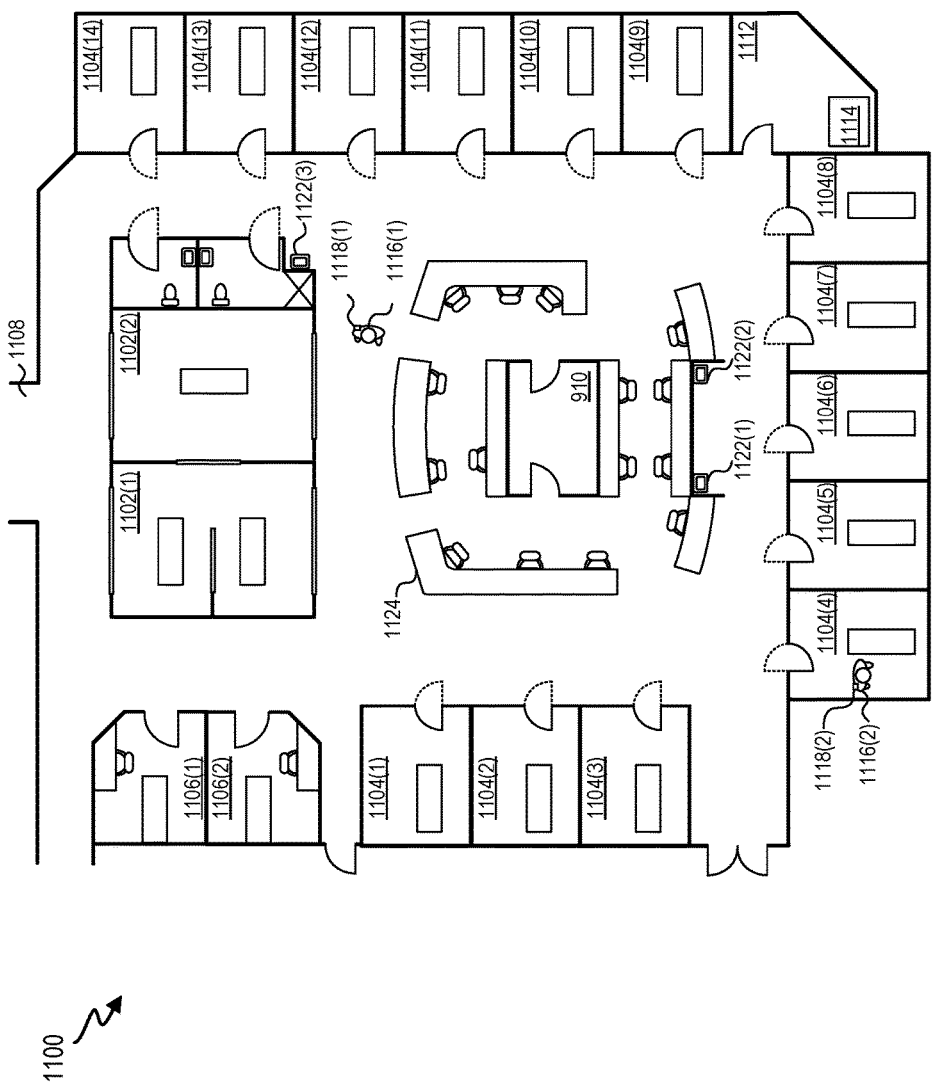

FIGS. 11A-11C illustrate various diagrams of a facility 1100, according to several embodiments of the present disclosure. Facility 1100 may be a stand-alone facility or may be part of a larger facility. Facility 1100 may include a wide range of equipment. In some embodiments, facility 1100 may include various rooms, corridors, entries, exits, desk areas, storage areas, and the like. For example, facility 1100 may include one or more first rooms 1102, one or more second rooms 1104, one or more third rooms 1106, a vestibule 1108, a supply room 1110, a server room 1112, and a front desk 1124.

In some embodiments, arrival of an individual at facility 1100 may trigger an event corresponding to a protocol. In some instances, the protocol may include a set of actions to be completed by one or more entities. The particular protocol, along with other protocols, may be stored in a local server 1114 located in server room 1112 or in a remote server outside facility 1100.

In many circumstances it may be beneficial to monitor and track progress and completion of events using a plurality of mobile wireless transceivers 1118 and mounted wireless transceivers 1120. Mobile wireless transceivers 1118 may be attached and/or carried by entities 1116 and may include and/or be integrated with any type of electronic device (e.g., computer, mobile device, smart phone, laptop, electronic badge, RFID tag, tablet, or pager). Mobile wireless transceivers 1118 need not have both transmitting and receiving capabilities, but may instead have only transmitting capabilities (e.g., wireless transmitter) or only receiving capabilities (e.g., wireless receiver). For example, mobile wireless transceivers 1118 may comprise wireless transmitters, such as active RFID tags, capable of transmitting wireless electromagnetic signals.

In contrast, mounted wireless transceivers 1120 may be attached and/or mounted to a secured surface such as a ceiling, floor, wall, desk, etc. Mounted wireless transceivers 1120 need not have both transmitting and receiving capabilities, but may instead have only transmitting capabilities (e.g., wireless transmitter) or only receiving capabilities (e.g., wireless receiver). For example, mounted wireless transceivers 1120 may comprise wireless receivers, such as active RFID readers, capable of receiving wireless electromagnetic signals. Mounted wireless transceivers 1120 may include and/or be integrated with any type of electronic device, such as a smart television having voice and/or facial recognition. Mounted wireless transceivers 1120 may be configured to receive and/or send wireless signals to mobile wireless transceivers 1118, and mobile wireless transceivers 1118 may be configured to receive and/or send wireless signals to mounted wireless transceivers 1120.

In one example, as entity 1116(1) carries mobile wireless transceiver 1118(1) and moves near mounted wireless transceiver 1120(1), mounted wireless transceiver 1120(1) may transmit an identifier and location request signal which is received by mobile wireless transceiver 1118(1). In response to receiving the identify and location request signal, mobile wireless transceiver 1118(1) may transmit a response wireless signal carrying information corresponding to entity 1116(1) to mounted wireless transceiver 1120(1) as well as to other nearby mounted wireless transceivers 1120, such as mounted wireless transceivers 1120(2) and 1120(3). The response wireless signal may be received by one or more of mounted wireless transceivers 1120(1), 1120(2), and 1120(3) and may be processed to extract identification data and location data corresponding to entity 1116(1). In another example, mounted wireless transceiver 1120(1) may receive a signal carrying information corresponding to entity 1116(1) that is obtained by voice and/or facial recognition. The signal may be processed to extract identification data corresponding to entity 1116(1).

The response wireless signal may be processed by processors within mounted wireless transceivers 1120(1), 1120 (2), and 1120(3), or may be processed by local server 1114 which may be coupled with each of mounted wireless transceivers 1120(1), 1120(2), and 1120(3). For example, local server 1114 may include one or more processors configured to detect, based on the response wireless signal, identification data and location data corresponding to entity 1116(1). In some embodiments, local server 1114 may determine an identifier of entity 1116(1) based on the identification data, and may determine a location of entity 1116(1) based on the location data. In some instances, the location may comprise an (X, Y) coordinate of where entity 1116(1) is situated within facility 1100. The location may be determined based on a trilateration technique where the signal level measured by each of mounted wireless transceivers 1120(1), 1120(2), and 1120(3) are compared to each other and the location is calculated based on the comparison.

In some embodiments, the positioning of mounted wireless transceivers 1120 within facility 1100 may improve the ability to identify and locate entities 1116. In reference to FIG. 11B, mounted wireless transceivers 1120 may be positioned at various points of interest, such as rooms and areas in which actions within events take place or are likely to take place. For example, mounted wireless transceivers 1120 may be positioned within rooms (e.g., first rooms 1102, second rooms 1104, and third rooms 1106) at a center point, at an entry point, or near a location in which an individual is likely to be situated (e.g., near a chair or bed). Mounted wireless transceivers 1120 may also be positioned near other points of interest where certain actions within events take place. In one example, a protocol may include an action to be performed at a station near room 1104(1). The action may only be determined as being performed when the identifier and the location of entity 1116(1) are confirmed to be within a threshold distance of one of stations 1122.

In reference to FIG. 11C, mounted wireless transceivers 1120 may be positioned in a grid-like arrangement such that each is spaced equidistant from its nearest neighbors. Such an arrangement may have the advantage of providing reliable and/or constant tracking of entities 1116 within facility 1100. For example, mounted wireless transceivers 1120 may be positioned such that "dead zones" do not exist within facility 1100 where mobile wireless transceiver 1118(1) is unable to receive or send wireless signals to any of mounted wireless transceivers 1120. In some embodiments, the periodicity of the spacing may differ in one direction from the other direction (e.g., spacing in the X-direction may be greater or less than spacing in the Y-direction).

Figure 12:
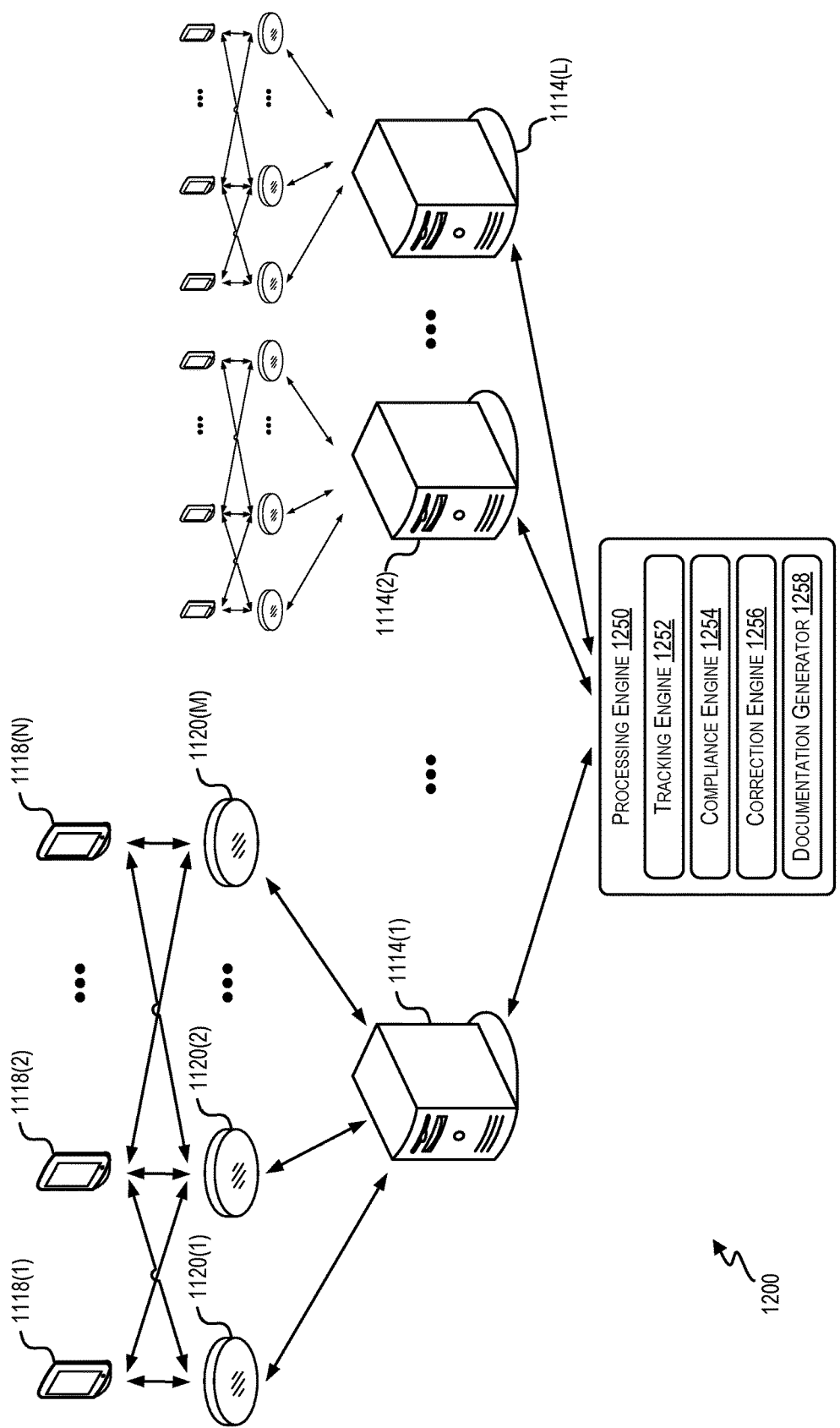
FIG. 12 is an example schematic architecture illustrating a system in which techniques relating to assessing completion of events may be implemented, according to at least one example.

FIG. 12 illustrates a system 1200 comprising a plurality of local servers 1114, according to several embodiments of the present disclosure. Each local server 1114 is configured to communicate with a plurality of mobile wireless transceivers 1118 and/or a plurality of mounted wireless transceivers 1120 at different facilities 1100. Local servers 1114 are configured to communicate with a processing engine 1250 such that processing engine 1250 receives information corresponding to multiple facilities 1100, perhaps dispersed over a wide geographic area. Processing engine 1250 may include various engines and generators, including a tracking engine 1252, a compliance engine 1254, a correction engine 1256, and a documentation generator 1258.

Figure 13:
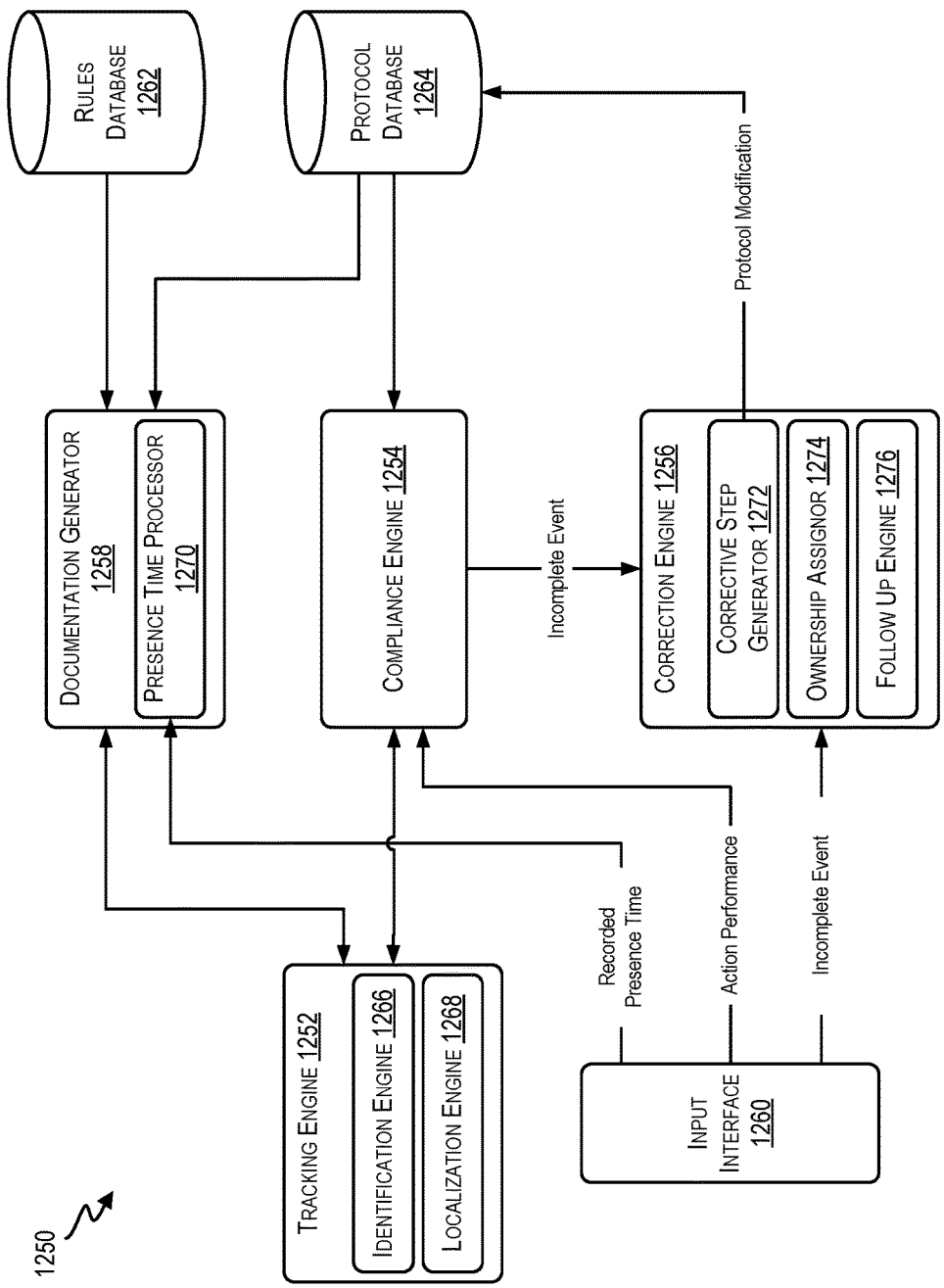
FIG. 13 is an example diagram illustrating an aspect of the system of FIG. 12 in more detail.

FIG. 13 illustrates a processing engine 1250, according to several embodiments of the present disclosure. Processing engine 1250 may be an example of processing engine 950 discussed above. In some embodiments, tracking engine 1252 processes the wireless signals transmitted and received by mobile wireless transceivers 1118 and mounted wireless transceivers 1120. In some embodiments, tracking engine 1252 includes an identification engine 1266 for detecting, based on the wireless signals, identification data corresponding to an entity. Identification engine 1266 may then analyze the identification data to determine an identifier of the entity. In some embodiments, tracking engine 1252 includes a localization engine 1268 for detecting, based on the wireless signals, location data corresponding to the entity. Localization engine 1268 may then analyze the location data to determine one or more locations of the entity.

In some embodiments, the identifier and the location is sent by tracking engine 1252 to compliance engine 1254. Compliance engine 1254 may retrieve a protocol from a protocol database 1264 to determine whether each action of a set of actions defined by the protocol have been performed or are being performed. For each action of the set of actions, compliance engine 1254 may determine that an action was performed based on the received identifier and location. Alternatively or additionally, compliance engine 1254 may determine that an action was performed based on input received via an input interface 1260 indicating action performance. In some embodiments, upon determining that each action of the set of actions defined by a protocol have been performed, compliance engine 1254 may generate an output indicating that an event corresponding to the protocol was completed. The output may be stored in a message associated with a record.

In some embodiments, compliance engine 1254 may determine that one or more actions of a protocol were not performed. Upon determining that one or more actions of a protocol were not performed, compliance engine 1254 may send a message to correction engine 1256 indicating that an event corresponding to the protocol was incomplete. Correction engine 1256 may include a corrective step generator 1272 for generating corrective steps for the event. In some embodiments, corrective step generator 1272 may generate a protocol modification for modifying one or more protocols within protocol database 1264. Correction engine 1256 may also include an ownership assignor 1274 for assigning ownership of the corrective steps to an owner. Ownership assignor 1274 may also send a notification to the owner indicating the ownership and the corrective steps. In some embodiments, correction engine 1256 may include a follow up engine 1276 for following up with the owner to determine whether or not the corrective steps were performed by the owner. In some embodiments, correction engine 1256 may receive a user input via input interface 1260 indicating that an event was incomplete. The user input may also indicate a protocol modification for modifying one or more protocols within protocol database 1264.

In some embodiments, documentation generator 1258 retrieves a protocol from protocol database 1264 and identifies one or more rules from rules database 1262 specifying a required documentation corresponding to at least one of the set of actions defined by the protocol. In some instances, documentation generator 1258 may cause tracking engine 1252 to generate and/or retrieve an identifier and a location of an entity as described herein. Documentation generator 1258 may generate the required documentation based on the identifier and the location of the entity.

In some embodiments, documentation generator 1258 includes a presence time processor 1270 for modifying an presence time recorded by an entity. In some instances, documentation generator 1258 receives a user input via user interface 1260 corresponding to a recorded presence time. Documentation generator 1258 may cause tracking engine 1252 to generate and/or retrieve an identifier and a location of the entity as described herein. After receiving the identifier and the location of the entity, presence time processor 1270 may generate a temporal dwell based on the location and/or location data. Presence time processor 1270 may then recalculate the recorded presence time as a function of the temporal dwell.

Figure 14:
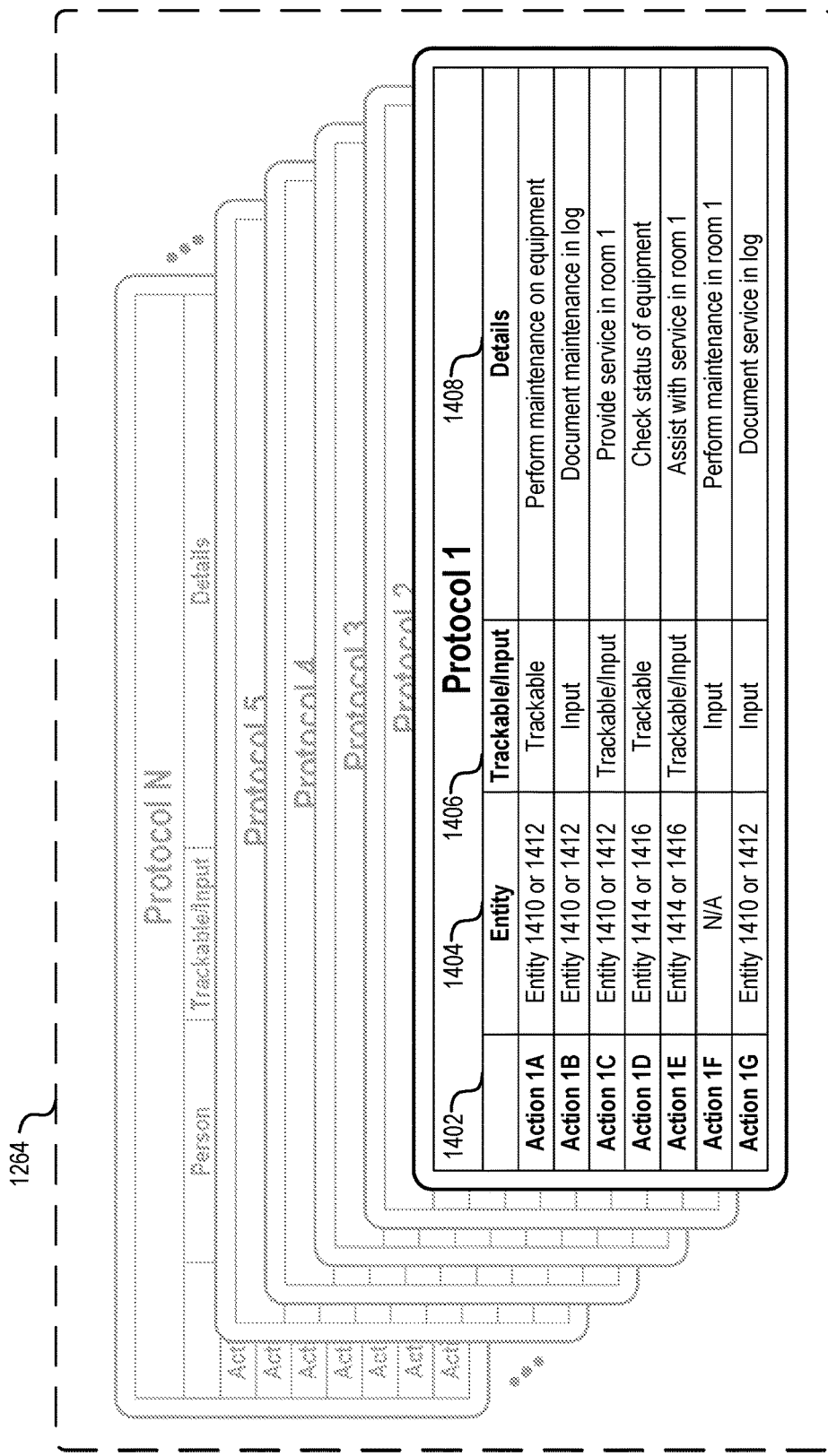
FIG. 14 is an example diagram of protocols that may be implemented, according to at least one example.

FIG. 14 illustrates various protocols stored within a protocol database 1264, according to several embodiments of the present disclosure. Protocols may be requested and/or retrieved by compliance engine 1254 and documentation generator 1258. In some instances, one or more protocols may be modified by corrective step generator 1272. In one example, a protocol (e.g., Protocol 1) includes seven actions indicated by column 1402. An entity or multiple entities associated with each action is indicated by column 1404. Entities 1410 and 1412 may be first type of entity, while Entities 1414 and 1416 may be a second type of entity. Whether a particular action is determined to be performed by using data generated by tracking engine 1252 (e.g., Trackable) and/or by user input received via input interface 1260 (e.g., Input) is indicated by column 1406. In some instances, certain actions are only able to be determined to be performed by user input due to difficulties in tracking performance using mobile wireless transceivers 1118 and mounted wireless transceivers 1120 (e.g., Room clean up). Protocols may be used to generate event vectors as discussed above with reference to FIG. 12.

Figure 15A:
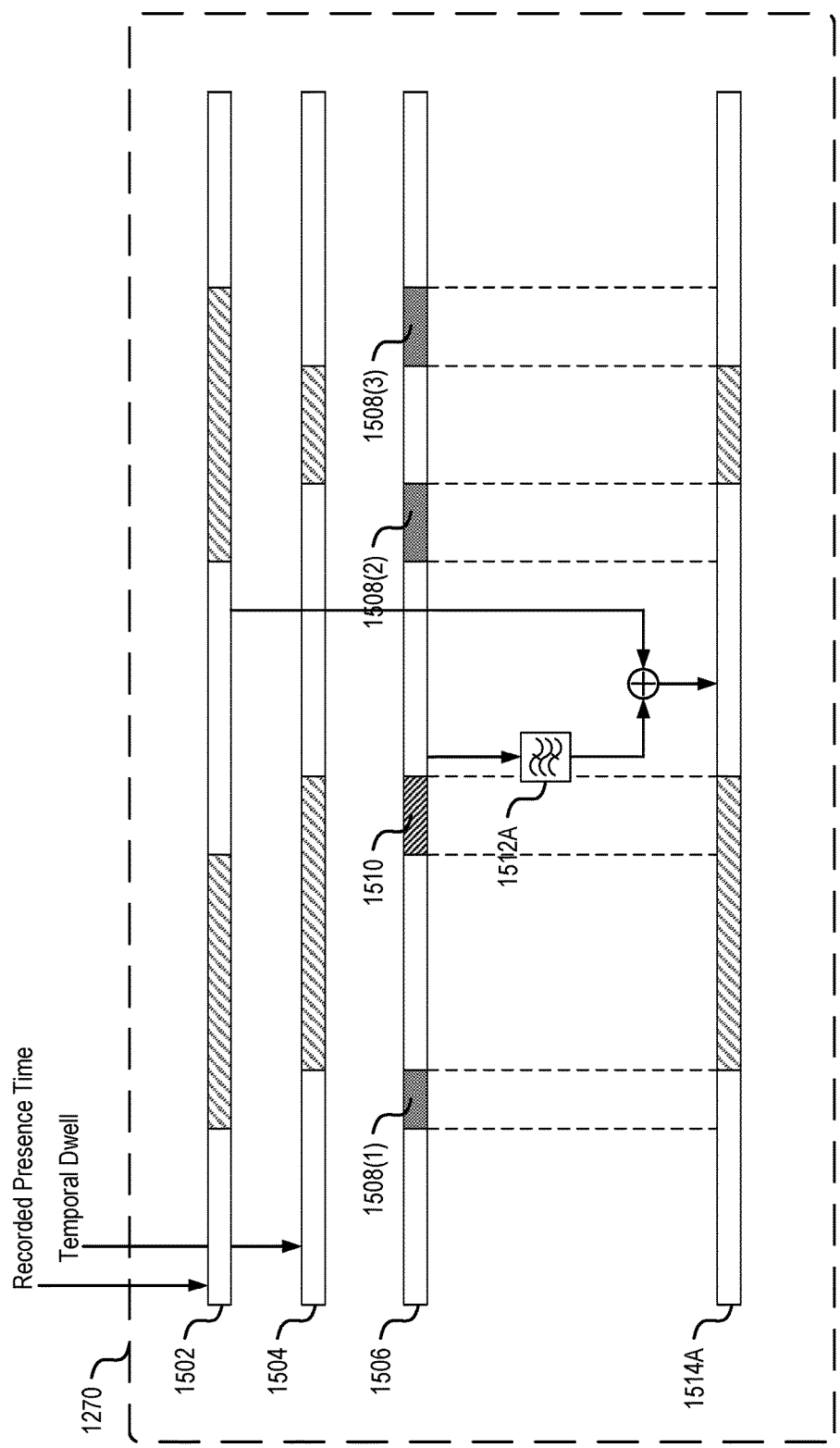
FIGS. 15A-15D are example schematic models of presence time processors, according to at least one example.
Figure 15B:
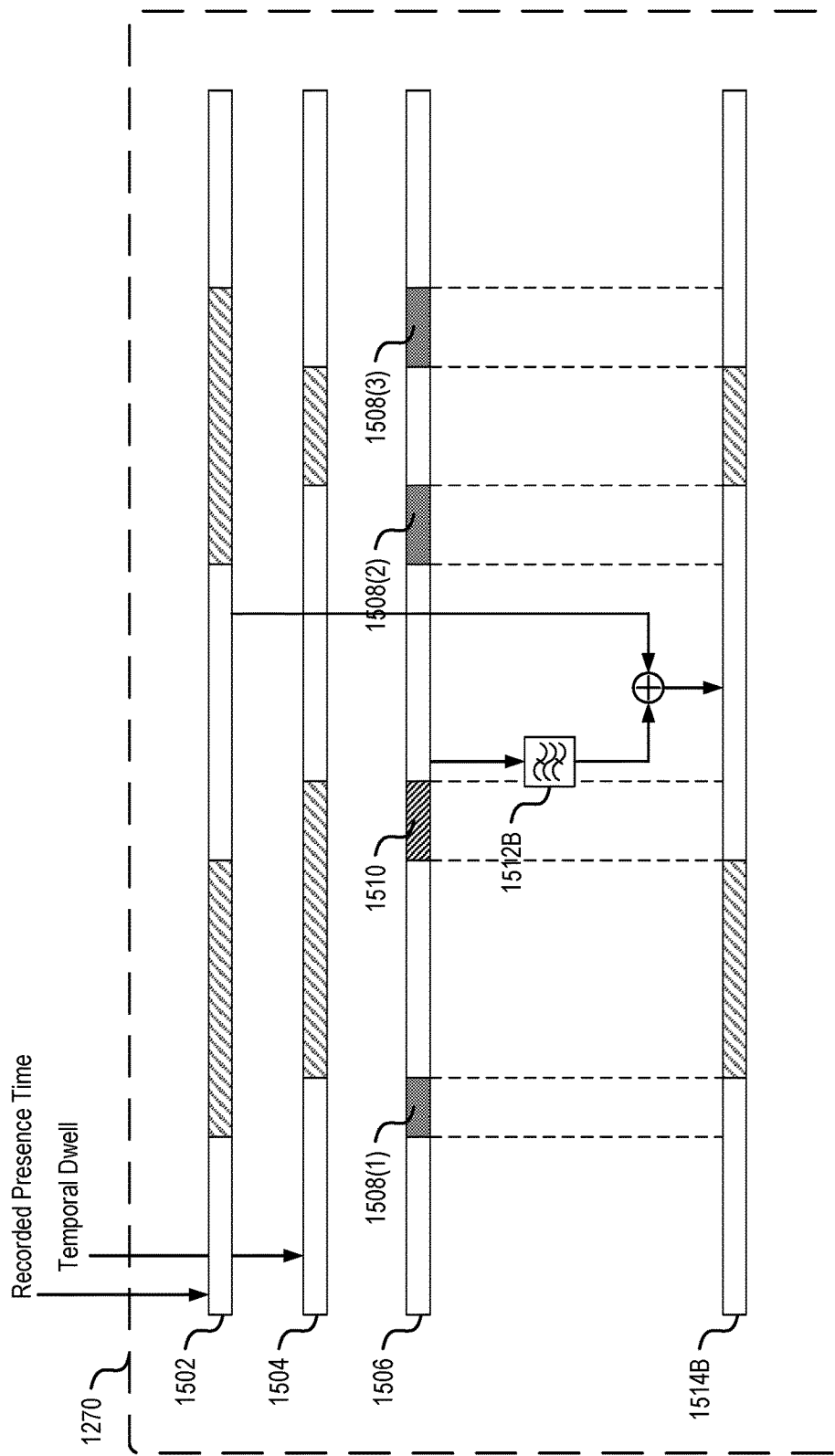
Figure 15C:
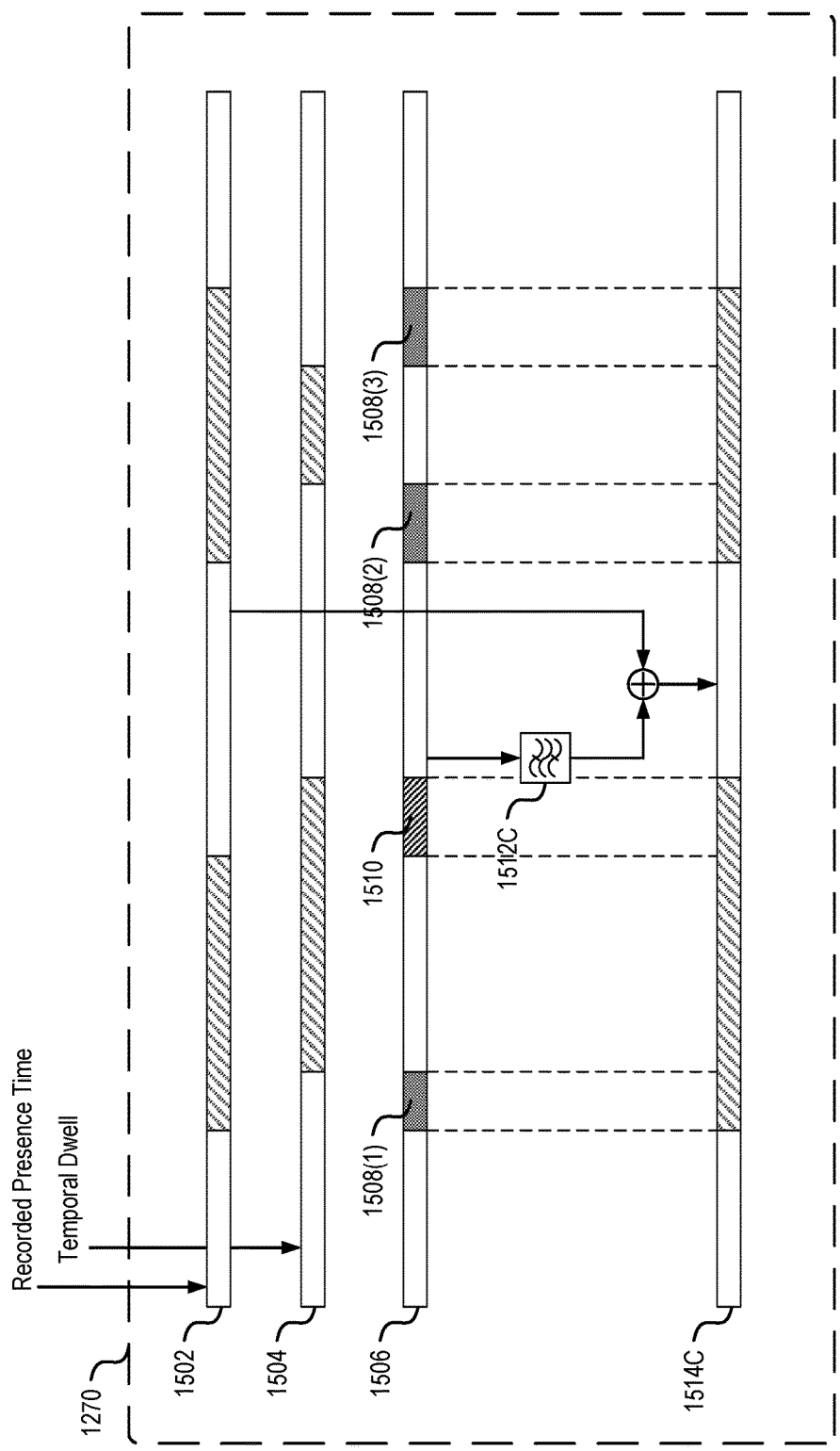
Figure 15D:
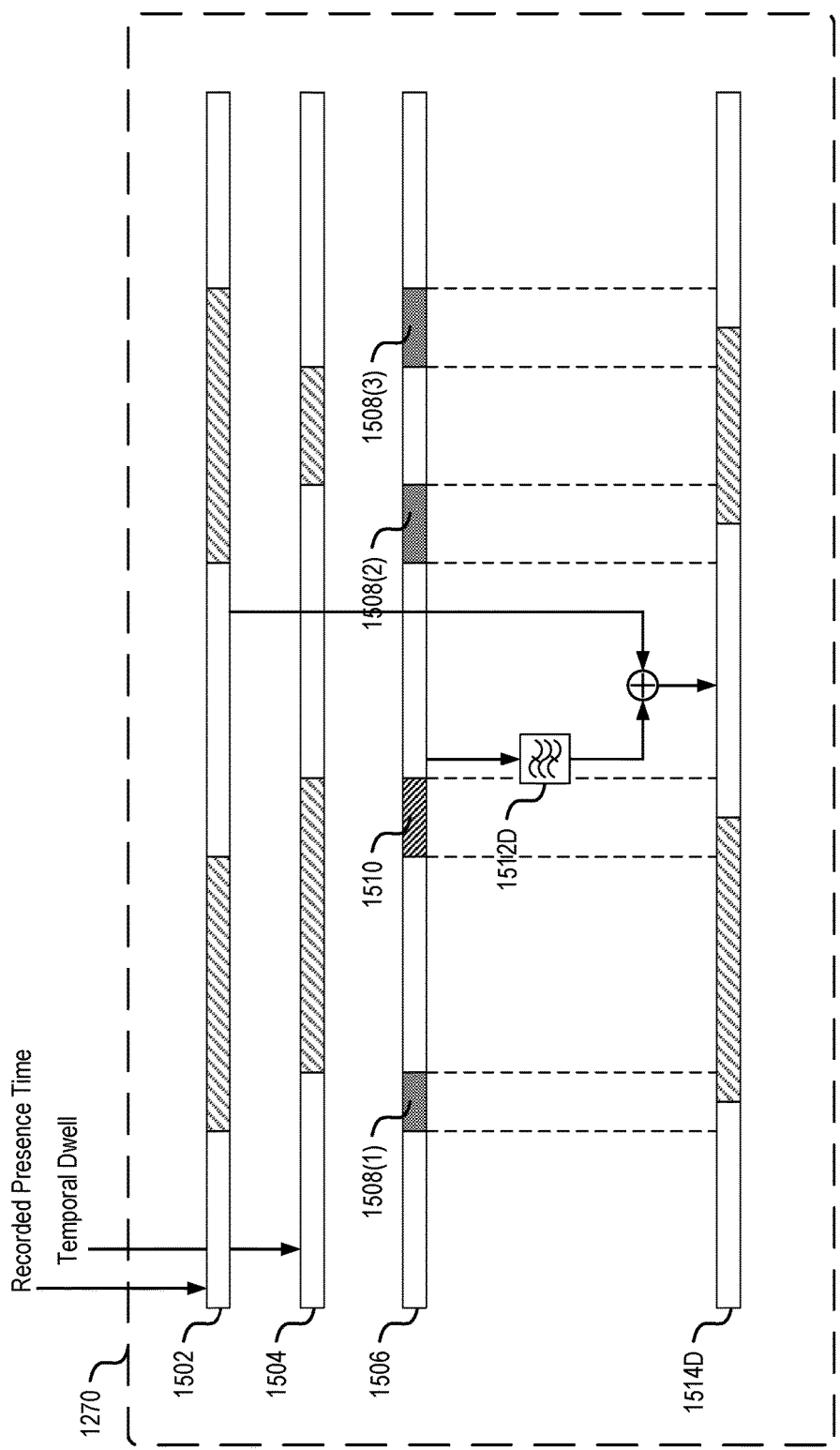

FIGS. 15A-15D illustrate various embodiments of presence time processor 1270 which may, in some instances, be configured to modify an presence time that is recorded by an entity to reflect a more accurate presence time. In reference to FIG. 15A, presence time processor 1270 may receive as inputs a recorded presence time 1502 and a temporal dwell 1504. Recorded presence time 1502 may be a single quantity or may a set of start and stop times from which a single quantity may be derived. As shown in FIG. 15A, recorded presence time 1502 may not perfectly correspond to temporal dwell 1504 generated by tracking engine 1252. For example, a comparison of recorded presence time 1502 with temporal dwell 1504 may yield an error signal 1506 comprised of one or more over-reported times 1508 and one or more under-reported times 1510. In some instances, over-reported times 1508 may correspond to times in which recorded presence time 1502 is represented but temporal dwell 1504 is not represented. In contrast, under-reported times 1510 may correspond to times in which recorded presence time 1502 is not represented but temporal dwell 1504 is represented.

In some instances, error signal 1506 is passed through a filter 1512A and then combined with recorded presence time 1502 to yield a modified presence time 1514A. In some embodiments, filter 1512A may be configured to set over-reported times 1508 to a negative value and under-reported times 1510 to a positive value, having the effect of removing over-reported times 1508 from recorded presence time 1502 and adding under-reported time 1510 to recorded presence time 1502. Although configuring filter 1512A in this manner may be effective at improving accuracy in many instances, there may be circumstances in which under and over reporting may be treated differently. This may be accomplished by adjusting filter 1512A according to the following scenarios. In reference to FIG. 15B, filter 1512B may be configured to set over-reported times 1508 to a negative value and under-reported times 1510 to a value of zero, having the effect of removing over-reported times 1508 from recorded presence time 1502 and ignoring under-reported time 1510. This results in a modified presence time 1514B. In reference to FIG. 15C, filter 1512C may be configured to set over-reported times 1508 to a value of zero and under-reported times 1510 to a positive value, having the effect of keeping over-reported times 1508 in recorded presence time 1502 and adding under-reported time 1510 to recorded presence time 1502. This results in a modified presence time 1514C. In reference to FIG. 15D, filter 1512D may be configured to set over-reported times 1508 to a negative half value and under-reported times 1510 to a positive half value, having the effect of keeping only half of over-reported times 1508 in recorded presence time 1502 and adding only half of under-reported time 1510 to recorded presence time 1502. This results in a modified presence time 1514D. Other possibilities are contemplated.

FIGS. 16, 17, 18, and 19 illustrate example flow diagrams showing processes 1600, 1700, 1800, and 1900, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors. The computer-readable storage medium is non-transitory.

Figure 16:
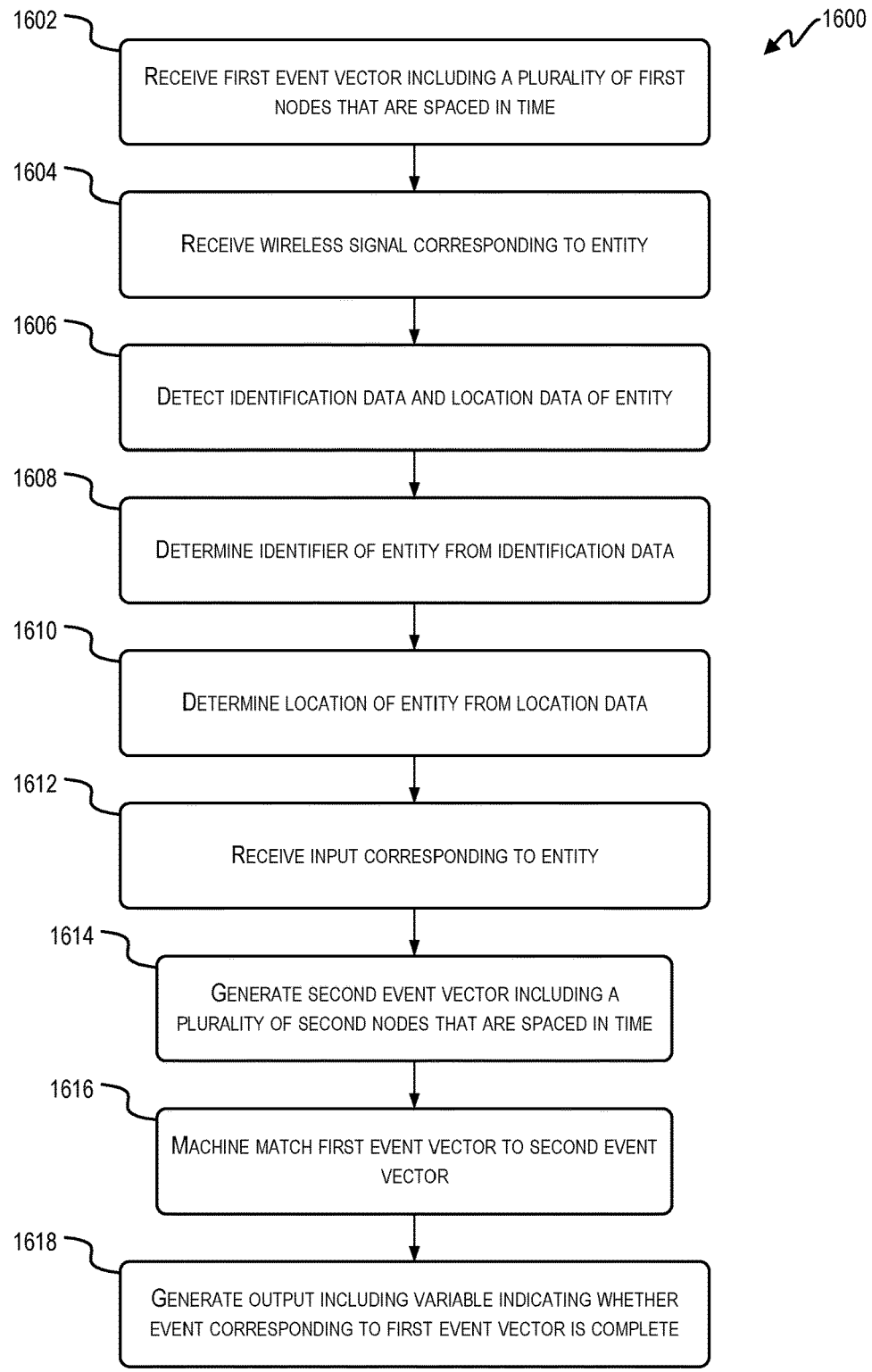
FIG. 16 is an example flowchart for determining whether a protocol was performed, according to at least one example.

FIG. 16 illustrates a process 1600 for determining whether an event was completed, according to several embodiments of the present disclosure. At operation 1602, a first event vector including a plurality of first nodes that are spaced in time is received. In some embodiments, the first nodes correspond to a set of actions within a protocol, and at least one action of the set of actions is performable by an entity. For example, a particular action may include a particular entity performing the particular action at a particular location within a facility, such as a room within the facility. In some embodiments, an action may not be associated with a particular entity, such as an action requiring a particular temperature in a room. Certain actions may be required prior to other actions.

At operation 1604, a wireless signal carrying information corresponding to the entity may be received. The wireless signal may be a signal transmitted by a mobile wireless transmitter carried or attached to the entity and received by a mounted wireless receiver, or may be a signal transmitted by a mounted wireless transmitter and received by a mobile wireless receiver. In one example, after a protocol is received, it may be determined that the protocol includes an action to be performed by a specific entity at a specific location within the facility. One or more mounted wireless transceivers in the vicinity of the specific location may then transmit a wireless signal which is received by a mobile wireless transceiver being carried by the specific entity that is currently performing the action. The mobile wireless transceiver may then transmit a response wireless signal back to the one or more mounted wireless transceivers including information corresponding to the specific entity. For example, the information may include identification data (e.g., the specific entity's identification number) and/or location data (e.g., a GPS location, or signal-strength data).

At operation 1606, identification data and location data corresponding to the entity may be detected based on the wireless signal. Detecting the identification data and location data may include receiving the wireless signal and extracting the information contained within the wireless signal using any one of various data communication techniques (e.g., Quadrature amplitude demodulation). In some instances, detecting may occur at a mobile wireless receiver and/or a mounted wireless receiver. In some instances, detecting may occur within a local or remote server where the information contained within the wireless signal is analyzed. In some embodiments, the location data may not only include a location but time information associated with the location. For example, the location data may be analyzed to determine that an entity was in a particular location for a particular amount of time. The location data may be provided for a plurality of time points.

At operation 1608, an identifier of the entity may be determined based on the identification data. In some instances, information contained within the wireless signal includes the entity's identifier, such as an RFID tag number. In some embodiments, the identifier of the entity is determined based on the signal strength or the carrier frequency of the received signal (e.g., a first type of entity may have a high signal strength while a second type of entity may have a low signal strength, etc.). In some embodiments, one or more entities may have the same identifier. For example, in some embodiments each of the first type of entity may be associated with different ID numbers while each of the second type of entity may be associated with the same ID number.

At operation 1610, a location of the entity may be determined based on the location data. In some embodiments, information contained within the wireless signal may include an (X, Y) coordinate of the entity's location. For example, in some embodiments a mobile wireless transceiver may be equipped with GPS capabilities such that the mobile wireless transceiver may directly report its position using a GPS coordinate. In some embodiments, the location of the entity may be determined based on a trilateration technique where the signal level measured by different mounted wireless transceivers is compared. For example, the location of an entity may be determined to be in a particular room because wireless signals received by mounted wireless receivers equidistantly spaced surrounding the particular room have similar received signal strengths. In some embodiments, mounted wireless receivers are positioned in different rooms, and the location of the entity is determined to be in the room in which the received signal strength is the greatest.

At operation 1612, user input corresponding to the entity may be received. The user input may include a plurality of conditionals for the entity. The plurality of conditionals may indicate whether the entity performed actions required by a protocol, along with the time and location at which the entity performed each of the actions. In some embodiments, the user input may be generated by a user using an application on a smart phone or other electronic device, which may or may not be integrated with the mobile wireless transceiver being carried by the entity or user. In some embodiments, the application may provide an interface through which the entity or user may press a button, check a box, or type in information indicating that a particular action was performed. In some embodiments, certain actions within a protocol that are not associated with an entity must be reported as being performed via user input on an electronic device.

At operation 1614, a second event vector including a plurality of second nodes that are spaced in time is generated. The second event vector may be generated based on the information within the wireless signal corresponding to the entity and/or the user input corresponding to the entity. For example, a node may be generated when it is determined that an action was completed based on an identifier and a location of the entity that are obtained via operations 1604 and/or 1612. In some instances, certain actions within a protocol that are deemed to be of utmost importance may require both user input reporting that the action was performed and a determination based on the information derived from the wireless signal.

At operation 1616, the first event vector may be machine matched to the second event vector to generate a variable indicating whether an event corresponding to the first event vector is complete. If each of the plurality of the first nodes of the first event vector matches a corresponding one of the plurality of the second nodes of the second event vector, the variable indicates that the event corresponding to the first event vector is complete. On the other hand, if at least one of the plurality of the first nodes of the first event vector is mismatched with a corresponding one of the plurality of the second nodes of the second event vector, the variable indicates that the event corresponding to the first event vector is incomplete. For example, with regard to an action corresponding to one of the plurality of the second nodes of the second event vector, a particular entity may arrive at the wrong room, may not spend an adequate amount of time in a room, or may perform the action in an inadequate manner.

At operation 1618, an output including the variable indicating whether the event corresponding to the first event vector is complete is generated. In some embodiments, the output signal may cause the protocol corresponding to the event to be deleted, reset, returned back to a remote server, or to be stored in a record (e.g., using a message). In some embodiments, the output signal itself may be stored in a message associated with a record.

Figure 17:
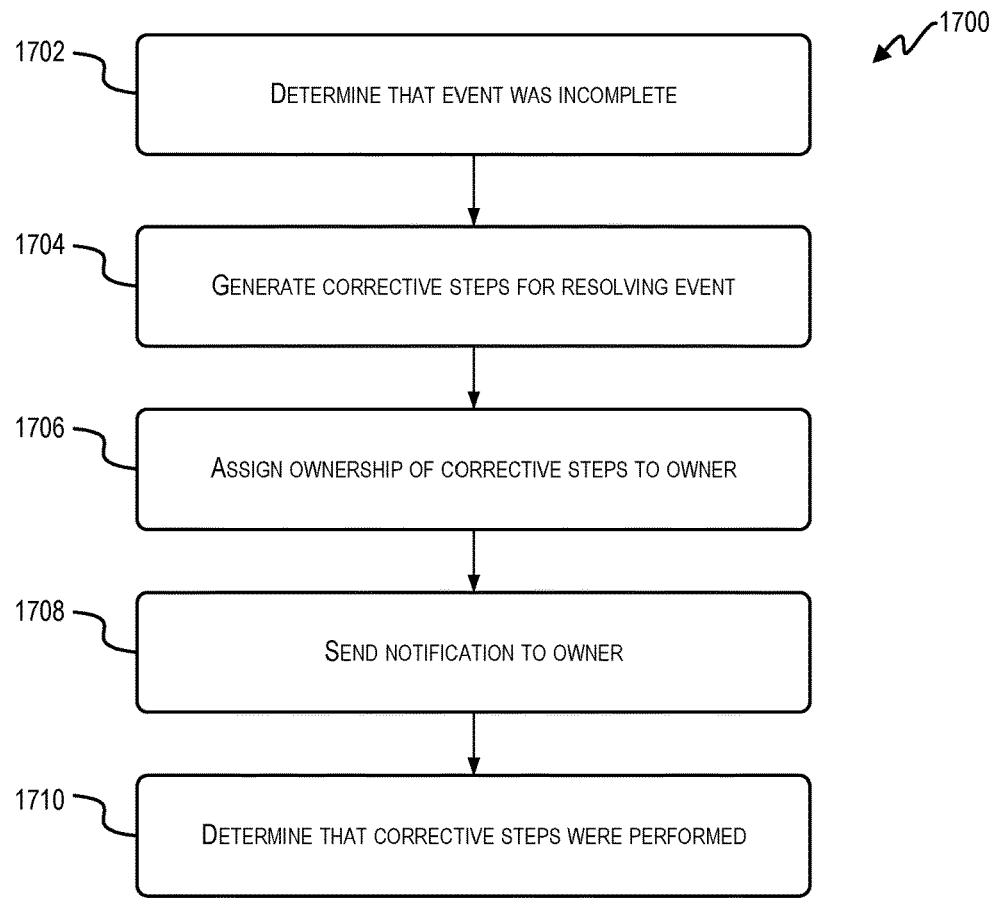
FIG. 17 is an example flowchart for resolving an event, according to at least one example.

FIG. 17 illustrates a process 1700 for resolving an incomplete event, according to several embodiments of the present disclosure. At operation 1702, it may be determined that an event was incomplete based on the machine matching of operation 1618.

At operation 1704, corrective steps for resolving the incomplete event are generated. In some embodiments, the corrective steps may be generated using a machine learning algorithm which analyzes default corrective steps, corrective steps used in the past, and/or corrective steps suggested via user input. In other embodiments, the corrective steps may be suggested by a use. The corrective steps may include repeating an unperformed action, repeating a protocol, and/or modifying a protocol. The corrective steps may be generated such that they may be performed similar to that of protocols, e.g., actions performable by entities.

At operation 1706, ownership of the corrective steps is assigned to an owner. The owner may be an entity who is to perform some or all of the corrective steps, or may be a manager or department head associated with an entity who is to perform some or all of the corrective steps. Ownership may be assigned to a single or multiple owners, and may be assigned to an entity or organization. For example, failure to retrieve waste receptacles may cause ownership of the corrective steps to be assigned to a waste management company.

At operation 1708, a notification is sent to the owner indicating the ownership and the corrective steps. The notification may be sent to the electronic device of the owner, which may or may not be integrated with a mobile wireless transceiver. The notification may include a summary message indicating what event was incomplete, what corrective steps were generated, who was assigned ownership, and when the corrective steps are to be performed (i.e., deadline). In some instances, the notification may require that the owner reply to acknowledge receipt of the notification.

At operation 1710, it is determined that the corrective steps were performed after a predetermined amount of time. In some instances, the deadline established by the notification is used as a triggering mechanism for determining whether the corrective steps were performed. Once triggered, a follow up engine may determine whether each step of the corrective steps were performed. Failure to perform a single step may cause a second notification to be sent to the owner indicating either the previous corrective steps or a new set of corrective steps (e.g., omitting the portion of the previous corrective steps that were performed).

Figure 18:
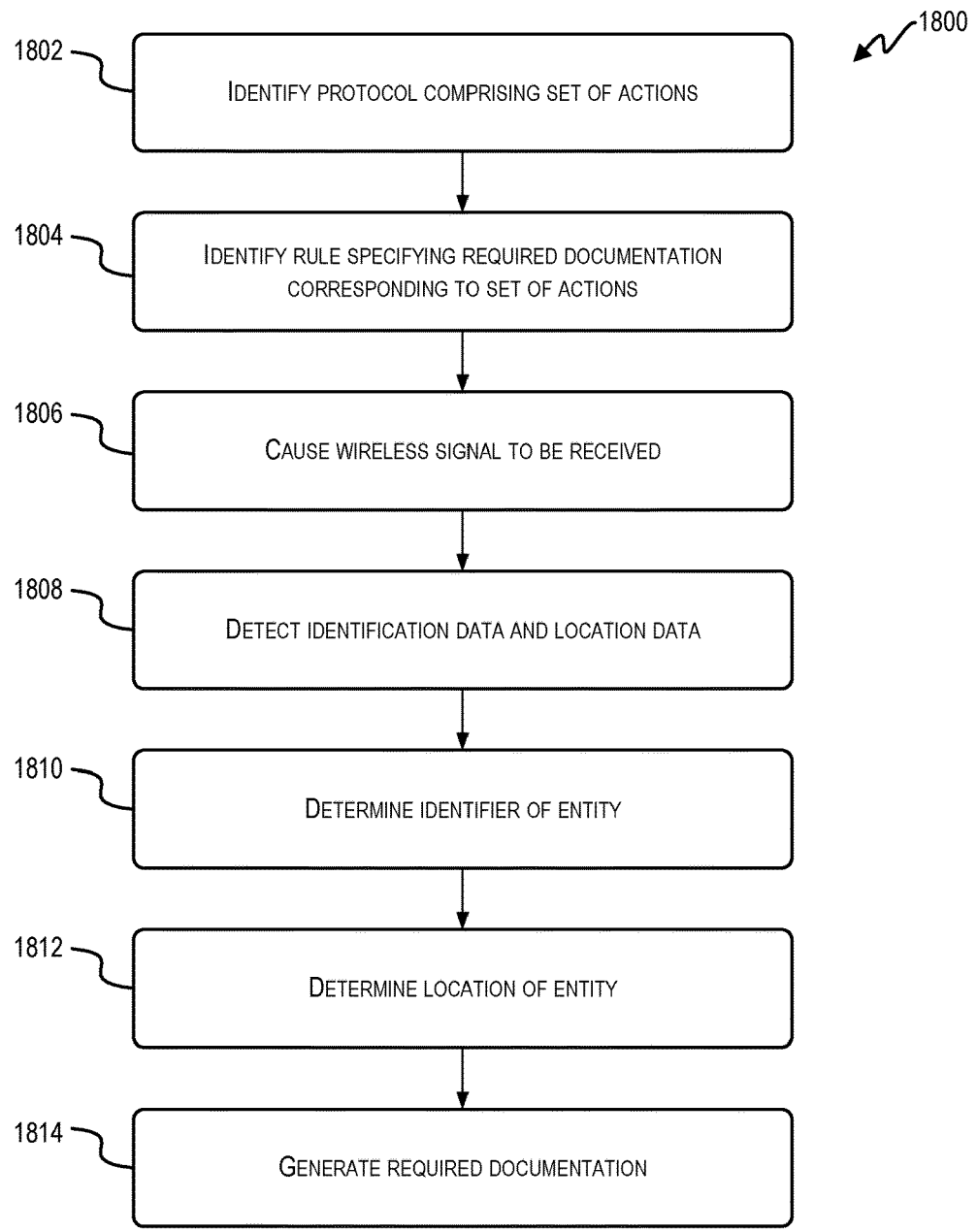
FIG. 18 is an example flowchart for generating documentation, according to at least one example.

FIG. 18 illustrates a process 1800 for generating documentation, according to several embodiments of the present disclosure. At operation 1802, a protocol comprising a set of actions is identified. The protocol may be similar to protocols described herein, and may include one or more actions performable by an entity.

At operation 1804, one or more rules specifying a required documentation corresponding to at least one of the set of actions is identified. In some instances, each of the set of actions may be analyzed to determine whether documentation is required. The corresponding rules may be identified and analyzed so that the required documentation may be generated. In some instances, the rules may specify the format of the required documentation, and/or may specify a form with modifiable fields to be used. In some instances, the rules are stored in a local or remote database (e.g., rules database 1262).

At operation 1806, a wireless signal carrying information corresponding to an entity is caused to be received based on the required documentation. In some embodiments, if the required documentation includes a modifiable field for the total amount of time an entity was in a room, the wireless signal caused to be received may correspond to the entity indicated in the required documentation. In some instances, operation 1806 may include the details described in reference to operation 1604.

At operation 1808, identification data and location data corresponding to the entity are detected based on the wireless signal. In some instances, operation 1808 may include the details described in reference to operation 1606.

At operation 1810, an identifier of the entity is determined based on the identification data. In some instances, operation 1810 may include the details described in reference to operation 1608.

At operation 1812, a location of the entity is determined based on the location data. In some instances, operation 1812 may include the details described in reference to operation 1610.

At operation 1814, the required documentation is generated based on the entity's identifier and the location. In some instances, the required documentation is a list of time stamps corresponding to when an entity entered or exited a room. In some embodiments, the required documentation is a pair of time stamps corresponding to when an entity entered and exited a facility, demonstrating that the entity did not work longer than allowed by a state or federal law. In some embodiments, the required documentation is a list of entities that entered a room during a temporal window, demonstrating that the minimum required number of entities were present during the temporal window. Other possibilities are contemplated using the techniques described herein.

Figure 19:
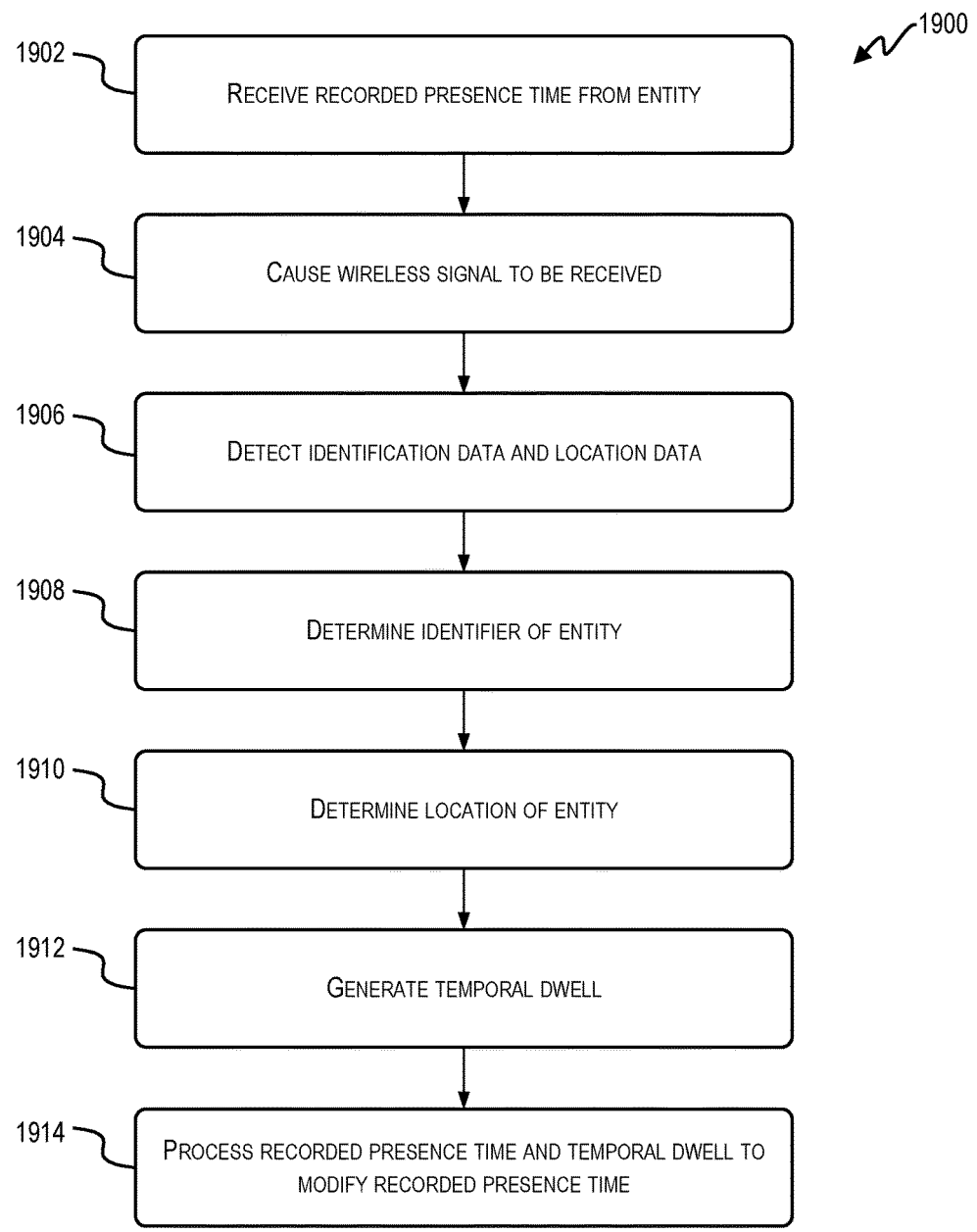
FIG. 19 is an example flowchart for modifying recorded presence time, according to at least one example.

FIG. 19 illustrates a process 1900 for modifying recorded presence time, according to several embodiments of the present disclosure. At operation 1902, a recorded presence time is received from an entity. In some embodiments, the recorded presence time may be generated by a user using an application on a smart phone or other electronic device, which may or may not be integrated with the mobile wireless transceiver being carried by the entity or user. In some embodiments, the application may provide an interface through which the entity may enter information indicating the recorded presence time.

At operation 1904, a wireless signal corresponding to the entity is caused to be received based on the recorded presence time. For example, if the entity entered a recorded presence time indicating that it was in a particular room for 45 minutes, the wireless signal caused to be received may involve one or both of the mobile wireless transceiver carried by the entity and the mounted wireless transceiver positioned in or near the particular room. In some instances, operation 1904 may include the details described in reference to operation 1604.

At operation 1906, identification data and location data are detected based on the wireless signal. In some instances, operation 1906 may include the details described in reference to operation 1606.

At operation 1908, an identifier of the entity is determined based on the identification data. In some instances, operation 1908 may include the details described in reference to operation 1608.

At operation 1910, a location of the entity is determined based on the location data. In some instances, operation 1910 may include the details described in reference to operation 1610.

At operation 1912, a temporal dwell is generated based on the location data. In some embodiments, the location data may be associated with different time stamps or time markers. For example, if it is determined that an entity is in a particular room based on the received wireless signal, the time at which the wireless signal was received may be used to generate the temporal dwell. For instance, the temporal dwell may be calculated as the difference between a first time at which a first wireless signal was received and a second time at which a second wireless signal was received.

At operation 1914, the recorded presence time and the temporal dwell are processed to modify the recorded presence time. As described in reference to FIGS. 15A-15D, various approaches may be employed to modify the recorded presence time. In a first approach (described in reference to FIG. 15A), the temporal dwell is used to modify the recorded presence time by removing over-reported times and adding under-reported times. In a second approach (described in reference to FIG. 15B), the temporal dwell is used to modify the recorded presence time by removing both over-reported times and under-reported times. In a third approach (described in reference to FIG. 15C), the temporal dwell is used to modify the recorded presence time by adding both over-reported times and under-reported times. In a fourth approach (described in reference to FIG. 15D), the temporal dwell is used to modify the recorded presence time by adding only half of over-reported times and under-reported times.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for assessing completion of events, the computer-implemented method comprising:
    receiving a first event vector, wherein the first event vector comprises a plurality of first nodes that are spaced in time, and the plurality of the first nodes corresponds to a temporal sequence of actions within a protocol;
    at least one of:
        receiving a wireless signal carrying information corresponding to an entity, wherein the information comprises a location of the entity as a function of time and an identifier of the entity; or
        receiving input corresponding to the entity, wherein the input comprises a plurality of conditionals for the entity;
    generating a second event vector, wherein the second event vector comprises a plurality of second nodes that are spaced in time, and wherein the second event vector is generated as a function of at least one of the information corresponding to the entity or the input corresponding to the entity;
    machine matching the first event vector to the second event vector, wherein the machine matching generates a variable indicating whether an event corresponding to the first event vector is complete; and
    generating an output comprising the variable, wherein:
    if each of the plurality of the first nodes of the first event vector matches a corresponding one of the plurality of the second nodes of the second event vector, the variable indicates that the event corresponding to the first event vector is complete, and
    if at least one of the plurality of the first nodes of the first event vector is mismatched with the corresponding one of the plurality of the second nodes of the second event vector, the variable indicates that the event corresponding to the first event vector is incomplete.

2. The computer-implemented method of claim 1, wherein the wireless signal is transmitted by a mobile wireless transmitter and received by a mounted wireless receiver, and wherein the mobile wireless transmitter is carried by the entity.

3. The computer-implemented method of claim 1, wherein the wireless signal is transmitted by a mounted wireless transmitter and received by a mobile wireless receiver, and wherein the mobile wireless receiver is carried by the entity.

4. The computer-implemented method of claim 1, further comprising:
 storing the output in a message associated with a record.

5. The computer-implemented method of claim 2, wherein the mobile wireless transmitter is integrated with a computer, a mobile device, a smart phone, a laptop, an electronic badge, an RFID tag, a tablet, or a pager.

6. The computer-implemented method of claim 2, wherein the mounted wireless receiver is integrated with a device having at least one of voice recognition or facial recognition.

7. The computer-implemented method of claim 1, further comprising:
 scanning, by a scanning device, a bag machine-readable (MR) tag coupled to or integrated with a fluid bag, the bag MR tag encoded with a bag identifier such that the scanning device is configured to read the bag identifier upon scanning the bag MR tag;
 scanning, by the scanning device, a pump MR tag coupled to or integrated with an infusion pump, the pump MR tag encoded with a pump identifier such that the scanning device is configured to read the pump identifier upon scanning the pump MR tag;
 transmitting, by the scanning device, the bag identifier and the pump identifier to a processing engine;
 receiving, by the processing engine, the bag identifier and the pump identifier from the scanning device;
 determining, by the processing engine, a bag volume associated with the fluid bag based on the bag identifier;
 receiving, by the processing engine, pump data from the infusion pump, wherein the pump data is indicative of one or more of an infusion rate, an infusion time, a volume to be infused (VTBI), and the pump identifier;
 determining, by the processing engine, based on at least the bag volume and the one or more of the infusion rate, the infusion time, the VTBI, and the pump identifier, a depletion time associated with the fluid bag; and
 sending, by the processing engine, at a predetermined amount of time prior to the depletion time, an alert indicating imminent depletion of the fluid bag.

8. A system comprising:
 one or more data processors; and
 a non-transitory computer readable storage medium containing instructions that, when executed on the one or more data processors, cause the one or more data processors to perform actions including:
  receiving a first event vector, wherein the first event vector comprises a plurality of first nodes that are spaced in time, and the plurality of the first nodes corresponds to a temporal sequence of actions within a protocol;
  at least one of:
   receiving a wireless signal carrying information corresponding to an entity, wherein the information comprises a location of the entity as a function of time and an identifier of the entity; or
   receiving input corresponding to the entity, wherein the input comprises a plurality of conditionals for the entity;
  generating a second event vector, wherein the second event vector comprises a plurality of second nodes that are spaced in time, and wherein the second event vector is generated as a function of at least one of the information corresponding to the entity or the input corresponding to the entity;
  machine matching the first event vector to the second event vector, wherein the machine matching generates a variable indicating whether an event corresponding to the first event vector is complete; and
  generating an output comprising the variable, wherein:
   if each of the plurality of the first nodes of the first event vector matches a corresponding one of the plurality of the second nodes of the second event vector, the variable indicates that the event corresponding to the first event vector is complete, and
   if at least one of the plurality of the first nodes of the first event vector is mismatched with the corresponding one of the plurality of the second nodes of the second event vector, the variable indicates that the event corresponding to the first event vector is incomplete.

9. The system of claim 8, wherein the wireless signal is transmitted by a mobile wireless transmitter and received by a mounted wireless receiver, and wherein the mobile wireless transmitter is carried by the entity.

10. The system of claim 8, wherein the wireless signal is transmitted by a mounted wireless transmitter and received by a mobile wireless receiver, and wherein the mobile wireless receiver is carried by the entity.

11. The system of claim 8, wherein the actions further include:
 storing the output in a message associated with a record.

12. The system of claim 9, wherein the mobile wireless transmitter is integrated with a computer, a mobile device, a smart phone, a laptop, an electronic badge, an RFID tag, a tablet, or a pager.

13. The system of claim 9, wherein the mounted wireless receiver is integrated with a device having at least one of voice recognition or facial recognition.

14. The system of claim 11, wherein the actions further include:
 obtaining the message;
 parsing data within the message to identify one or more components of the data, the one or more components being arranged according to a first order, and wherein at least one of the one or more components comprises a string;
 identifying a component type of a plurality of component types associated with each of the one or more components of the data;
 aligning the one or more components of the data based on the component type such that the one or more components are arranged according to a second order, the second order being different than the first order;
 adding a transaction operation property to the data, wherein the transaction operation property determines at least one of a create operation, an update operation, a delete operation, or a cancel operation;
 transforming the string of the at least one of the one or more components into a programming object;
 classifying each of the one or more components as a resource of a plurality of resources; and
 outputting the message toward a destination system or a data warehouse.

15. A computer-program product tangibly embodied in a non-transitory machine-readable storage medium, including instructions configured to cause one or more data processors to perform actions including:

receiving a first event vector, wherein the first event vector comprises a plurality of first nodes that are spaced in time, and the plurality of the first nodes corresponds to a temporal sequence of actions within a protocol;

at least one of:

receiving a wireless signal carrying information corresponding to an entity, wherein the information comprises a location of the entity as a function of time and an identifier of the entity; or receiving input corresponding to the entity, wherein the input comprises a plurality of conditionals for the entity;

generating a second event vector, wherein the second event vector comprises a plurality of second nodes that are spaced in time, and wherein the second event vector is generated as a function of at least one of the information corresponding to the entity or the input corresponding to the entity;

machine matching the first event vector to the second event vector, wherein the machine matching generates a variable indicating whether an event corresponding to the first event vector is complete; and generating an output comprising the variable, wherein:

if each of the plurality of the first nodes of the first event vector matches a corresponding one of the plurality of the second nodes of the second event vector, the variable indicates that the event corresponding to the first event vector is complete, and if at least one of the plurality of the first nodes of the first event vector is mismatched with the corresponding one of the plurality of the second nodes of the second event vector, the variable indicates that the event corresponding to the first event vector is incomplete.

16. The computer-program product of claim 15, wherein the wireless signal is transmitted by a mobile wireless transmitter and received by a mounted wireless receiver, and wherein the mobile wireless transmitter is carried by the entity.

17. The computer-program product of claim 15, wherein the wireless signal is transmitted by a mounted wireless transmitter and received by a mobile wireless receiver, and wherein the mobile wireless receiver is carried by the entity.

18. The computer-program product of claim 15, wherein the actions further include:

storing the output in a message associated with a record.

19. The computer-program product of claim 16, wherein the mobile wireless transmitter is integrated with a computer, a mobile device, a smart phone, a laptop, an electronic badge, an RFID tag, a tablet, or a pager.

20. The computer-program product of claim 16, wherein the mounted wireless receiver is integrated with a device having at least one of voice recognition or facial recognition.

* * * * *